US009413784B2

(12) United States Patent
Kohno et al.

(10) Patent No.: US 9,413,784 B2
(45) Date of Patent: Aug. 9, 2016

(54) WORLD-DRIVEN ACCESS CONTROL

(71) Applicant: Microsoft Corporation, Redmond, WA (US)

(72) Inventors: Tadayoshi Kohno, Seattle, WA (US); David A. Molnar, Seattle, WA (US); Alexander N. Moshchuk, Kirkland, WA (US); Franziska Roesner, Seattle, WA (US); Jiahe Helen Wang, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 283 days.

(21) Appl. No.: 14/020,735

(22) Filed: Sep. 6, 2013

(65) Prior Publication Data

US 2015/0074742 A1   Mar. 12, 2015

(51) Int. Cl.
| | |
|---|---|
| *G06F 21/00* | (2013.01) |
| *H04L 29/06* | (2006.01) |
| *G06F 21/54* | (2013.01) |
| *G06F 21/62* | (2013.01) |
| *H04W 12/08* | (2009.01) |
| *H04W 4/00* | (2009.01) |
| *H04W 88/02* | (2009.01) |
| *H04W 12/02* | (2009.01) |

(52) U.S. Cl.
CPC ............... *H04L 63/20* (2013.01); *G06F 21/54* (2013.01); *G06F 21/6245* (2013.01); *H04W 12/08* (2013.01); *G06F 2221/2111* (2013.01); *H04W 4/008* (2013.01); *H04W 12/02* (2013.01); *H04W 88/02* (2013.01)

(58) Field of Classification Search
CPC ....... G06F 21/54; G06F 21/554; G06F 21/60; G06F 21/604; G06F 21/62; G06F 21/6245; G06F 21/629
See application file for complete search history.

(56) References Cited

U.S. PATENT DOCUMENTS

| | | | |
|---|---|---|---|
| 6,085,976 A | 7/2000 | Sehr | |
| 7,693,545 B2 | 4/2010 | Park | |
| 7,706,837 B2 | 4/2010 | Ladouceur | |
| 7,856,652 B2 * | 12/2010 | Hieda | ................. G06F 21/6218 726/1 |

(Continued)

FOREIGN PATENT DOCUMENTS

WO    WO2009145730 A1    12/2009

OTHER PUBLICATIONS

Jana, et al., "A Scanner Darkly: Protecting User Privacy from Perceptual Applications," retrieved at <<http://www.cs.utexas.edu/~shmat/shmat_oak13darkly.pdf>>, Proceedings of the 2013 IEEE Symposium on Security and Privacy, May 19, 2013, 15 pages.

(Continued)

*Primary Examiner* — Edward Zee
(74) *Attorney, Agent, or Firm* — Alin Corle; Sandy Swain; Micky Minhas

(57) ABSTRACT

Functionality is described herein for managing the behavior of one or more applications, such as augmented reality applications and/or other environment-sensing applications. The functionality defines permission information in a world-driven manner, which means that the functionality uses a trusted mechanism to identify cues in the sensed environment, and then maps those cues to permission information. The functionality then uses the permission information to govern the operation of one or more applications.

20 Claims, 12 Drawing Sheets

(56) References Cited

U.S. PATENT DOCUMENTS

| | | | |
|---|---|---|---|
| 7,996,879 | B1 | 8/2011 | Fang et al. |
| 8,219,144 | B2 | 7/2012 | Benco et al. |
| 8,254,902 | B2 | 8/2012 | Bell et al. |
| 8,326,272 | B1 | 12/2012 | Patro |
| 8,331,739 | B1 | 12/2012 | Abdulkader et al. |
| 8,719,605 | B2 | 5/2014 | Chakra et al. |
| 8,732,619 | B2 | 5/2014 | Knitowski |
| 8,744,143 | B2 | 6/2014 | Chen |
| 2001/0044775 | A1 | 11/2001 | Saito et al. |
| 2003/0081621 | A1 | 5/2003 | Godfrey et al. |
| 2004/0267410 | A1 | 12/2004 | Duri et al. |
| 2006/0004581 | A1 | 1/2006 | Claudatos et al. |
| 2006/0048142 | A1 | 3/2006 | Roese et al. |
| 2006/0064384 | A1 | 3/2006 | Mehrotra et al. |
| 2007/0162966 | A1 | 7/2007 | Agrawal et al. |
| 2007/0250410 | A1 | 10/2007 | Brignone et al. |
| 2008/0016335 | A1 | 1/2008 | Takahashi et al. |
| 2008/0180243 | A1* | 7/2008 | Aaron .................... G08B 23/00 340/540 |
| 2008/0307527 | A1 | 12/2008 | Kaczmarski et al. |
| 2009/0141940 | A1 | 6/2009 | Zhao et al. |
| 2009/0259591 | A1 | 10/2009 | Starostin et al. |
| 2009/0313254 | A1 | 12/2009 | Mattox et al. |
| 2009/0322890 | A1 | 12/2009 | Bocking et al. |
| 2010/0040288 | A1 | 2/2010 | Yen et al. |
| 2010/0077484 | A1 | 3/2010 | Paretti et al. |
| 2010/0107220 | A1 | 4/2010 | Nguyen |
| 2010/0211666 | A1 | 8/2010 | Kvernvik et al. |
| 2010/0226535 | A1 | 9/2010 | Kimchi et al. |
| 2010/0235519 | A1 | 9/2010 | Hu et al. |
| 2011/0143811 | A1 | 6/2011 | Rodriguez |
| 2012/0019683 | A1 | 1/2012 | Susanu et al. |
| 2012/0042076 | A1 | 2/2012 | Kawa et al. |
| 2012/0069051 | A1 | 3/2012 | Hagbi et al. |
| 2012/0192247 | A1 | 7/2012 | Oliver et al. |
| 2012/0218296 | A1 | 8/2012 | Belimpasakis |
| 2012/0222083 | A1 | 8/2012 | Vaha-Sipila et al. |
| 2012/0249741 | A1 | 10/2012 | Maciocci et al. |
| 2012/0311131 | A1 | 12/2012 | Arrasvuori |
| 2012/0311708 | A1 | 12/2012 | Agarwal et al. |
| 2013/0044128 | A1 | 2/2013 | Liu et al. |
| 2013/0050262 | A1 | 2/2013 | Jeon |
| 2013/0117840 | A1 | 5/2013 | Roesner et al. |
| 2013/0132084 | A1 | 5/2013 | Stonehocker et al. |
| 2013/0239192 | A1 | 9/2013 | Linga |
| 2013/0263016 | A1 | 10/2013 | Lehtiniemi et al. |
| 2013/0303077 | A1 | 11/2013 | Ohmata et al. |
| 2014/0009609 | A1 | 1/2014 | Webster et al. |
| 2014/0196152 | A1 | 7/2014 | Ur et al. |
| 2014/0282840 | A1 | 9/2014 | Guinan |
| 2015/0074746 | A1 | 3/2015 | Kohno et al. |

OTHER PUBLICATIONS

Ferreira, et al., "Security and Privacy in a Middleware for Large Scale Mobile and Pervasive Augmented Reality," retrieved at <<http://ieeexplore.ieee.org/stamp/stamp.jsp?tp=&arnumber=4446125>>, 15th International Conference on Software, Telecommunications and Computer Networks, Sep. 2007, 5 pages.

"Augmented Reality and Privacy,"retrieved at <<http://www.arlab.com/blog/augmented-reality-and-privacy/>>, Augmented Reality Lab S.L., Madrid, Spain, accessed on Jun. 5, 2013, 4 pages.

Friedman, et al., "New Directions: A Value-Sensitive Design Approach to Augmented Reality," retrieved at <<http://www.vsdesign.org/publications/pdf/friedman00newdirections.pdf>>, Proceedings of DARE 2000 on Designing Augmented Reality Environments, 2000, pp. 163-164.

Aryan, et al., "Securing Location Privacy in Augmented Reality," retrieved at <<http://ieeexplore.ieee.org/stamp/stamp.jsp?tp=&arnumber=5578714>>, 5th International Conference on Industrial and Information Systems, Jul. 29, 2010, pp. 172-176.

Szalavari, et al., "Collaborative Gaming in Augmented Reality," retrieved at <<http://www.cg.tuwien.ac.at/research/vr/gaming/mahjongg/vrst98.pdf>>, Proceedings of the ACM Symposium on Virtual Reality Software and Technology, 1998, 10 pages.

Azuma, Ronald T. "A Survey of Augmented Reality," retrieved at <21 <http://www.cs.unc.edu/~azuma/ARpresence.pdf>>, Presence: Teleoperators and Virtual Environments, vol. 6, Issue 4, Aug. 1997, 48 pages.

Azuma, et al., "Recent Advances in Augmented Reality," retrieved at <<http://ieeexplore.ieee.org/stamp/stamp.jsp?tp=&arnumber=963459 >>, IEEE Computer Graphics and Applications, vol. 21, Issue 6, Nov. 2001, pp. 34-47.

Beresford, et al., "MockDroid: Trading Privacy for Application Functionality on Smartphones," retrieved at <<http://acm.org>>, Proceedings of the 12th Workshop on Mobile Computing Systems and Applications, Mar. 2011, pp. 49-54.

Chu, et al., "Mobile Apps: It's Time to Move Up to CondOS," retrieved at <<http://research.microsoft.com/pubs/147238/chu.pdf>>, Proceedings of the 13th Workshop on Hot Topics in Operating Systems, May 2011, 5 pages.

"Kinect for Xbox 360 Privacy Considerations," retrieved at <<http://www.microsoft.com/privacy/technologies/kinect.aspx>>, retrieved on Aug. 7, 2013, Microsoft Corporation, Redmond, WA, 1 page.

"Kinect for Windows SDK," retrieved at http://www.microsoft.com/en-us/kinectforwindows/develop/new.aspx, retrieved on Aug. 7, 2013, Microsoft Corporation, Redmond, WA, 1 page.

Dwork, Cynthia, "The Differential Privacy Frontier," retrieved at <<http://131.107.65.14/pubs/80240/dwork-tcc09.pdf>>, Proceedings of the 6th Theory of Cryptography Conference on Theory of Cryptography, Mar. 2009, 7 pages.

Enck, et al., "TaintDroid: An Information-Flow Tracking System for Realtime Privacy Monitoring on Smartphones," retrieved at <<https://www.usenix.org/legacy/event/osdi10/tech/full_papers/Enck.pdf>>, Proceedings of 9th USENIX Symposium on Operating Systems Design and Implementation, Oct. 2010, 15 pages.

Felt, et al., "Android Permissions: User Attention, Comprehension, and Behavior," retrieved at <<http://acm.org>>, Proceedings of the Eighth Symposium on Usable Privacy and Security, Article No. 3, Jul. 2012, 14 pages.

"OpenCV," retrieved at <<http://opencv.org/about.html>>, retrieved on Aug. 7, 2013, 2 pages.

Guha, et al., "Koi: A Location-Privacy Platform for Smartphone Apps," retrieved at <<https://www.usenix.org/system/files/conference/nsdi12/nsdi12-final118.pdf>>, Proceedings of 9th USENIX Symposium on Networked Systems Design and Implementation, Apr. 2012, 14 pages.

Hornyack, et al., "These Aren't the Droids You're Looking for: Retrofitting Android to Protect Data from Imperious Applications," retrieved at <<http://homes.cs.washington.edu/~pjh/pubs/hornyack_appfence_ccs2011.pdf>>, Proceedings of the 18th ACM Conference on Computer and Communications Security, Oct. 2011, pp. 639-651.

Howell, et al., "What You See is What They Get: Protecting Users from Unwanted Use of Microphones, Cameras, and Other Sensors," retrieved at <<http://research.microsoft.com/pubs/131132/devices-camera-ready.pdf>>, Proceedings of the Web 2.0 Security and Privacy Workshop, May 2010, 9 pages.

Hutchings, Emma, "Augmented Reality Lets Shoppers See How New Furniture Would Look At Home," retrieved at <<http://www.psk.com/2012/05/augmented-reality-furniture-app.html>>, PSFK Labs, New York, NY, May 18, 2012, 3 pages.

Krumm, John, "A Survey of Computational Location Privacy," retrieved at <<http://acm.org>>, Personal and Ubiquitous Computing, vol. 13, Issue 6, Aug. 2009, pp. 391-399.

"What is Layar," retrieved at <<http://www.layar.com/what-is-layar/ >>, retrieved on Aug. 7, 2013, Layar US, New York, NY, 2 pages.

"Microsoft Research Face SDK Beta," retrieved at <<http://research.microsoft.com/en-us/projects/facesdk/>>, retrieved on Aug. 7, 2013, Microsoft Corporation, Redmond, WA, 2 pages.

"Microsoft Speech Platform," retrieved at http://msdn.microsoft.com/en-us/library/hh361572(v=office.14).aspx>>, retrieved on Aug. 7, 2013, Microsoft Corporation, Redmond, WA, 3 pages.

Newcombe, et al., "KinectFusion: Real-Time Dense Surface Mapping and Tracking," retrieved at <<http://eeexplore.ieee.org/stamp/

(56) References Cited

OTHER PUBLICATIONS stamp.jsp?tp=&arnumber=6162880>>, Proceedings of the 10th IEEE International Symposium on Mixed and Augmented Reality, Oct. 2011, pp. 127-136.
Poh, et al., "Advancements in Noncontact, Multiparameter Physiological Measurements Using a Webcam," retrieved at <<http://eeexplore.ieee.org/stamp/stamp.jsp?tp=&arnumber=5599853>>, IEEE Transactions on of Biomedical Engineering, vol. 58, Issue 1, Jan. 2011, pp. 7-11.
"Google Glass," retrieved at <<http://en.wikipedia.org/wiki/Google_Glass>>, retrieved on Aug. 7, 2013, Wikipedia article, 6 pages.
"Qualcomm Vuforia," retrieved at <<http://www.qualcomm.com/solutions/augmented-reality, retrieved on Aug. 7, 2013, Qualcomm Incorporated, San Diego, CA, 2 pages.
Roesner, et al., "User-Driven Access Control: Rethinking Permission Granting in Modern Operating Systems," retrieved at <<http://research.microsoft.com/pubs/152495/user-driven-access-control-nov2011.pdf>>, Microsoft Technical Report No. MSR-TR-2011-91, Microsoft Corporation, Redmond, WA, Aug. 2011, 16 pages.
Shotton, et al., "Real-time Human Pose Recognition in Parts from a Single Depth Image," retrieved at <<http://research.microsoft.com/pubs/145347/bodypartrecognition.pdf>>, Proceedings of the 24th IEEE Conference on Computer Vision and Pattern Recognition, Jun. 2011, 8 pages.
"Instantl.y Survey Creator," retrieved a <<http://www.instant.ly/>>, retrieved on Jun. 4, 2013, United Sample, Encino, CA, 4 pages.
Viola, et al., "Robust Real-time Object Detection," International Journal of Computer Vision, vol. 57, Issue 2, May 2004, pp. 137-154.
Abrash, Michael, "Latency—The sine qua non of AR and VR," retrieved at <<http://blogs.valvesoftware.com/abrash/latency-the-sine-qua-non-of-ar-and-vr/>>, Ramblings in Valve Time, a blog by Michael Abrash, Dec. 29, 2012, 80 pages.
Aiken, et al., "Deconstructing Process Isolation," retrieved at <<http://acm.org>>, Proceedings of the 2006 Workshop on Memory System Performance and Correctness, Oct. 22, 2006, 10 pages.
D'Antoni, et al., "FAST: A Transducer-Based Language for Tree Manipulation," retrieved at <<http://research.microsoft.com/pubs1179252/msr-tr-2012-123.pdf>>. Microsoft Research Technical Report No. MSR-TR-2012-123, Microsoft Corporation, Redmond, WA, Nov. 2012, 11 pages.
Dowty, et al., "GPU Virtualization on VMware's Hosted I/O Architecture," retrieved at <<http://static.usenix.org/events/wiov08/tech/full_papers/dowty/dowty.pdf>>, USENIX Workshop on I/O Virtualization, Dec. 2008, 8 pages.
Engler, et al., "Exterminate all Operating System Abstractions," retrieved at <<http://ieeexplore.ieee.org/stamp/stamp.jsp?tp=&arnumber=513459>>, Proceedings of the Fifth Workshop on Hot Topics in Operating Systems, May 1995, 6 pages.
Felt, et al., "How to Ask for Permission," retrieved at <<https://www.usenix.org/system/files/conference/hotsec12/hotsec12-final19.pdf>>, Proceedings of the 7th USENIX Conference on Hot Topics in Security, Aug. 2012, 6 pages.
"Clickjacking," retrieved at <<http://ha.ckers.org/blog/20080915/clickjacking/>>, retrieved on Jun. 5, 2013, 11 pages.
Gauger, Eliza, "Sonic-Style Grey Goo Cripples Second Life," retrieved at <<http://www.wired.com/gamelife/2006/11/sonicstyle_grey/>>, WIRED Magazine, Nov. 21, 2006, 4 pages.
Kaashoek, et al., "Application Performance and Flexibility on Exokernel Systems," retrieved at <<http://acm.org>>, Proceedings of the Sixteenth ACM Symposium on Operating Systems Principles, 2007, pp. 52-65.
"Grey Goo Fence," retrieved at <<http://Islwiki.net/Islwiki/wakka.php?wakka=GreyGooFence>>, retrieved on Aug. 7, 2013, LSL WIKI, 2 pages.
Poulsen, Kevin, "Hackers Assault Epilepsy Patients via Computer," retrieved at <<http://www.wired.com/politics/security/news/2008/03/epilepsy>>, WIRED magazine, Mar. 28, 2008, 1 page.

Nightingale, et al., "Helios: Heterogeneous Multiprocessing with Satellite Kernels," retrieved at <<http://acm.org>>, Proceedings of the ACM SIGOPS 22nd Symposium on Operating Systems Principles, Oct. 2009, pp. 221-234.
Roesner, et al., "User-Driven Access Control: Rethinking Permission Granting in Modern Operating Systems," retrieved at <<http://ieeexplore.ieee.org/stamp/stamp.jsp?tp=&arnumber=6234415>>, Proceedings of the IEEE Symposium on Security and Privacy, May 20, 2012, pp. 224-238.
Willow Garage, retrieved at <<http://www.willowgarage.com/pages/about-us>>, retrieved on Aug. 7, 2013, Willow Garage, Inc., Menlo Park, CA, 2 pages.
Viola, et al., "Robust Real-time Object Detection," retrieved at <<http://www.hpl.hp.com/techreports/Compaq-DEC/CRL-2001-1.pdf, Technical Report No. CRL 2001/01, Compaq Computer Corporation, Cambridge, MA, Feb. 2001, 30 pages.
"Willow Garage," retrieved at <<http://en.wikipedia.org/wi ki/Willow_Garage>>, retrieved on Aug. 7, 2013, Wikipedia article, 4 pages.
Beresford, Alastair R., "Location Privacy in Ubiquitous Computing," Technical Report No. 612, University of Cambridge, Computer Laboratory, Jan. 2005, retrieved at http://www.cl.cam.ac.uk/research/dtg/www/publications/public/arb33/UCAM-CL-TR-612.pdf, 139 pages.
Dabrowski, et al., "Framework based on Privacy Policy Hiding for Preventing Unauthorized Face Image Processing," Nov. 20, 2013, Retrieved at http://www.iseclab.org/people/atrox/P3F-dabrowski-etal.pdf, 7 pages.
Denning, et al., "In Situ with Bystanders of Augmented Reality Glasses: Perspectives on Recording and Privacy-Mediating Technologies," ACM CHI, CHI 2014, Apr. 26-May 1, 2014, Toronto, Ontario, Canada, 10 pages.
Geambasu et al., "Comet: An active distributed key-value store," University of Washington, USENIX OSDI, 2010, 14 pages.
Gray, Richard, "The places where Google Glass is banned," Dec. 2013, <<http://www.telegraph.co.uk/technology/google/10494231/The-places-where-Google-Glass-is-banned.html>>, 15 pages.
Gruteser, et al., "Privacy-Aware Location Sensor Networks," In Proceedings of the 9th Workshop on Hot Topics in Operating Systems, May 18, 2003, Retrieved at https://www.usenix.org/legacy/events/hotos03/tech/full_papers/gruteser/gruteser.pdf, 6 pages.
Meta, Inc., "Space Glasses," Oct. 2013, Retrieved at https://www.spaceglasses.com/, 3 pages.
NEEDADEBITCARD, Please quit posting pictures of your debit cards, people, 2013, Retrieved at https://twitter.com/NeedADebitCard, 1 page.
Quest Visual,"WordLens: See the world in your language," retrieved at <<http://questvisual.com/>>, Jan. 23, 2014, 2 pages.
Wang, et al., "Computerized-Eyewear Based Face Recognition System for Improving Social Lives of Prosopagnosics," Proceedings of Conference on Pervasive Computing Technologies for Healthcare and Workshops, May 2013, Retrieved at http://www2.cs.uh.edu/~gnawali/papers/eyewearfacepervasivehealth2013.pdf, 4 pages.
Wendlandt et al., "Perspectives: Improving SSH-style Host Authentication with Multi-Path Probing," USENIX '08: 2008 USENIX Annual Technical Conference, USENIX Security Symposium, Jun. 2008, 15 pages.
Namee, et al., "Motion in Augmented Reality Games: An Engine for Creating Plausible Physical Interactions in Augmented Reality Games," retrieved at <<http://acm.org>>, International Journal of Computer Games Technology, vol. 2010, Article No. 4, Jan. 2010, 8 pages.
D'Antoni, et al., "Operating System Support for Augmented Reality Applications," retrieved at <<http://www.cs.utexas.edu/~adunn/pubs/13hotos-aros.pdf>>, Proceedings of the 14th Workshop on Hot Topics in Operating Systems (HotOS), May 2013, 7 pages.
Sherstyuk, et at., "Virtual Roommates in Multiple Shared Spaces," retrieved at <<http://www.ugcs.caltech.edu/~andrei/PDF/roommates.isvri.2011.pdf>>, Proceedings of the IEEE International Symposium on VR Innovation, Mar. 19, 2011, 8 pages.
Grasset, et al., "Image-Driven View Management for Augmented Reality Browsers," retrieved at <<http://ieeexplore.ieee.org/stamp/

(56) References Cited

OTHER PUBLICATIONS stamp.jsp?tp=&arnumber=6402555>>, Proceedings of the IEEE International Symposium on Mixed and Augmented Reality, Nov. 2012, pp. 177-186.
Kaufmann, et al., "Simulating Educational Physical Experiments in Augmented Reality," retrieved at <<http://acm.org>>, Proceedings of ACM SIGGRAPH ASIA Educators Programme, Dec. 2008, Article No. 3, 8 pages.
Lang, et al., "Massively Multiplayer Online Worlds as a Platform for Augmented Reality Experiences," retrieved at <<http://nguyendangbinh.org/Proceedings/VR/2008/vr/sketches/lang.pdf>>, Proceedings of the IEEE Virtual Reality Conference, Mar. 2008, pp. 67-70.
"Method and System for Disabling Camera Feature of a Mobile Device," retrieved at <<http://www.ibridgenetwork.org/nanyangpolytechnic/method-and-system-for-disabling-camera-feature-of-a-mobile-de>>, ibridge, Nanyang Polytechnic, Singapore, posted on Jun. 18, 2002, 1 page.
Roesner, et al., "Providing Intent-Based Access to User-Owned Resources," U.S. Appl. No. 13/368,334, filed Feb. 8, 2012, 80 pages.
"Layar Catalogue," retrieved at <<http://www.layar.com/layers/>>, retrieved on Aug. 7, 2013, Layar U.S., New York, NY, 5 pages.
"Project Glass," retrieved at <<https://plus.google.com/+projectglass/posts>>, retrieved on Jun. 4, 2013, Google Inc., Googleplex, California, 10 pages.
Ardagna, et al., "Privacy-enhanced Location-based Access Control," retrieved at <<http://spdp.di.unimi.it/papers/location_chapter_pdf>>, in Handbook of Database Security, 2008, pp. 531-552.
Barton, et al., Letter from the U.S. Congress Bi-Partisan Privacy Caucus to Larry Page, regarding Google Glass, retrieved at <<http://joebarton.house.gov/images/GoogleGlassLtr_051613.pdf>>, May 2013, 3 pages.
Bauer, et al., "Device-enabled Authorization in the Grey System," retrieved at <<http://users.ece.cmu.edu/~jmmccune/papers/grey-isc05.pdf>>, Proceedings of the 8th International Conference on Information Security, 2005, pp. 431-445.
Cammozzo, Alberto, "What is TagMeNot?," retrieved at <<http://tagmenot.info/>>, retrieved on Aug. 7, 2013, 2 pages.
Halderman, et al., "Privacy Management for Portable Recording Devices," retrieved at <<http://acm.org>>, Proceedings of the 2004 ACM Workshop on Privacy in the Electronic Society, 2004, pp. 16-24.
Hurst, M. "The Google Glass feature no one is talking about," retrieved at <<http://creativegood.com/blog/the-google-glass-feature-no-one-is-talking-about/>>, creative good, Feb. 28, 2013, 35 pages.
Jana, et al., "Fine Grained Permissions for Augmented Reality Applications," retrieved at <<http://research.microsoft.com/apps/pubs/default.aspx?id=183680>>, Microsoft Technical Report No. MSR-TR-2013-11, Microsoft Corporation, Redmond, WA, Feb. 2013, 1 page.
"Convergence Beta," retrieved at <<http://convergence.io/>>, Thoughtcrime Labs Production, retrieved on Aug. 7, 2013, 1 page.
"Convergence Beta Details," retrieved at <<http://convergence.io/details.html>>, Thoughtcrime Labs Production, retrieved on Aug. 7, 2013, 2 pages.
Patel, et al., "BlindSpot: Creating Capture-Resistant Spaces," retrieved at <<http://www.cc.gatech.edu/~summetj/papers/BlindSpot-Book_Chapter-2009.pdf>>, Protecting Privacy in Video Surveillance, A. Senior (Ed.), Springer-Verlag, 2009, pp. 185-201.
Schiff, et al., "Respectful Cameras: Detecting Visual Markers in Real-Time to Address Privacy Concerns," IROS 2007, IEEE/RSJ International Conference on Intelligent Robots and Systems, Oct. 2007, pp. 971-978.
Starner, Thad, "The Challenges of Wearable Computing: Part 2," IEEE Micro, vol. 21, No. 4, 2001, pp. 54-67.
Murphy, David, "Seattle Bar Bans Google Glass. Who's Next?," retrieved at <<http://www.pcmag.com/article2/0,2817,2416421,00.asp>>, pcmag.com, Mar. 9, 2013, 5 pages.
D'Antoni, et al., "Managing Access by Applications to Perceptual Information," U.S. Appl. No. 14/020,708, filed Sep. 6, 2013, 85 pages.
Dunn, et al., "Managing Shared State Information Produced by Applications," U.S. Appl. No. 14/020,723, filed Sep. 6, 2013, 85 pages.
Jana, et al., "Enabling Fine-Grained Permissions for Augmented Reality Applications with Recognizers," retrieved at <<https://www.usenix.org/system/files/conference/usenixsecurity13/sec13-paper_jana.pdf>>, Proceedings of the 22nd USENIX Security Symposium, Aug. 14, 2013, 17 pages.
Vidas, et al., "QRishing: The Susceptibility of Smartphone Users to QR Code Phishing Attacks," retrieved at <<http://www.cylab.cmu.edu/files/pdfs/tech_reports/CMUCyLab12022.pdf>>, Report No. CMU-CyLab-12-022, Carnegie Mellon University, Pittsburgh, PA, Nov. 2012, 13 pages.
"About Willow Garage," retrieved at <<http://www.willowgarage.com/pages/about-us>> on Aug. 7, 2013, Willow Garage, Inc., Menlo Park, CA, 2 pages.
"Augmented Reality," Wikipedia, Retrieved on Nov. 27, 2014 from <<http://en.wikipedia.org/w/index.php?title=Augmented_reality&oldid=571607624>>, 19 pages.
Beresford et al., "MockDroid: trading privacy for application functionality on smartphones," Proceedings of the 12th Workshop on Mobile Computing Systems and Applications, Mar. 2011, 6 pages.
Levy, Henry M., "Capability-Based Computer Systems," Dec. 31, 1984, Butterworth-Heinemann, Newton, MA, Sections 1.1, 8.1, 8.2, 230 pages.
Qualcomm Vuforia, retrieved at <<http://www.qualcomm.com/solutions/augmented-reality>> on Aug. 7, 2013, Qualcomm Incorporated, San Diego, CA, 2 pages.
Szalavari et al., "Collaborative Gaming in Augmented Reality," Proceedings of the ACM Symposium on Virtual Reality Software and Technology, 1998, 10 pages.
Non-Final Office Action mailed Jun. 9, 2015 from U.S. Appl. No. 14/020,708, 14 pages.
Response filed Sep. 3, 2014 to Non-Final Office Action mailed Jun. 9, 2015 from U.S. Appl. No. 141020,708, 15 pages.
Article 34 Demand and Response filed Mar. 13, 2015 from PCT Patent Application No. PCT/US2014/053963, 23 pages.
Written Opinion mailed on Aug. 13, 2015 from PCT Patent Application No. PCT/US2014/053963, 7 pages.
Non-Final Office Action mailed Aug. 12, 2015 from U.S. Appl. No. 14/020,723, 21 pages.
International Search Report and Written Opinion mailed Dec. 9, 2014 from PCT Patent Application No. PCT/US2014/053769, 13 pages.
Article 34 Demand and Response filed Mar. 23, 2015 to International Search Report and Written Opinion mailed Dec. 9, 2014 from PCT Patent Application No. PCT/US2014/053769, 24 pages.
Written Opinion of the International Preliminary Examining Authority mailed Jul. 22, 2015 from PCT Patent Application No. PCT/US2014/053769, 9 pages.
Non-Final Office Action mailed Mar. 6, 2015 from U.S. Appl. No. 14/166,774, 28 pages.
Response filed May 7, 2015 to Non-Final Office Action mailed Mar. 6, 2015 from U.S. Appl. No. 14/166,774, 14 pages.
Final Office Action and Examiner Initiated Interview mailed Sep. 4, 2015 from U.S. Appl. No. 14/166,774, 32 pages.
Written Opinion of the International Preliminary Examining Authority mailed Aug. 14, 2015 from PCT Patent Application No. PCT/US2014/053771, 6 pages.
Response filed Sep. 9, 2015 to Non-Final Office Action mailed Aug. 12, 2015 from U.S. Appl. No. 14/020,723, 13 pages.
PCT Search Report and Written Opinion for PCT/US2014/053963, mailed on Dec. 1, 2014, 12 pages.
PCT Search Report and Written Opinion for PCT/US2014/053771, mailed on Dec. 1, 2014, 14 pages.
Molnar, et al., "Protecting Privacy in Web-Based Immersive Augmented Reality," U.S. Appl. No. 14/082,051, filed Nov. 14, 2013, 68 pages.
"Another way to attract women to conferences: photography policies," available at <<http://adainitiative.org/2013/07/another-way-

(56) References Cited

OTHER PUBLICATIONS to-attract-women-to-conferences-photography-policies/>>, The Ada Initiative, Jul. 4, 2013, 4 pages.
Avidan, et al., "Blind Vision," In Proceedings of the 9th European Conference on Computer Vision, 2006, 13 pages.
Hengartner, et al., "Protecting Access to People Location Information," In Security in Pervasive Computing, Lecture Notes in Computer Science, vol. 2802, 2004, 15 pages.
Borisov, et al., "Active Certificates: A Framework for Delegation," In Proceedings of the Network and Distributed System Security Symposium, 2002, 11 pages.
"CES 2011—Wearable HD 3D cameras by GOPRO," available at <<http://vimeo.com/18554202>>, butterscotch, access page for a video having a duration of 2.44 minutes, 2011, 2 pages.
Choe, et al., "Living in a Glass House: A Survey of Private Moments in the Home," In Proceedings of the 13th International Conference on Ubiquitous Computing, 2011, 4 pages.
Choe, et al., "Investigating Receptiveness to Sensing and Inference in the Home Using Sensor Proxies," In Proceedings of the 2012 ACM Conference on Ubiquitous Computing, 2012, 10 pages.
Clark, et al., "SoK: SSL and HTTPS: Revisiting past challenges and evaluating certificate trust model enhancements," In Proceedings of IEEE the Symposium on Security and Privacy, May 2013, 15 pages.
"Hands-on with Google Glass: Limited, fascinating, full of potential," available at <<http://reviews.cnet.com/google-glass/>>, Aug. 12, 2013, CNET.com, CBS Interactive Inc., with linked video presentation, CBS Interactive Inc., 25 pages.
"Qualcomm Fast Computer Vision SDK," available at <<http://www.cnx-software.com/2011/10/28/qualcomm-fast-computer-vision-sdk/>>, CNXSoft—Embedded Software Development, Oct. 2011, 5 pages.
"The Fitbit Story," available at <<http://www.fitbit.com/story>>, accessed on Jan. 20, 2014, Fitbit, Inc., San Francisco, CA, 11 pages.
Haldar, et al., "Semantic Remote Attestation—A Virtual Machine directed approach to Trusted Computing," In Proceedings of the Third Virtual Machine Research and Technology Symposium, 2004, 18 pages.
Hudson, et al., "Predicting Human Interruptibility with Sensors: A Wizard of Oz Feasibility Study," In Proceedings of SIGCHI Conference on Human Factors in Computing Systems, 2003, 8 pages.
Kharouni, Loucif, "The Dangers of Posting Credit Cards, IDs on Instagram and Twitter," available at <<http://blog.trendmicro.com/trendlabs-security-intelligence/the-dangers-of-posting-credit-cards-ids-on-instagram-and-twitter/>>, Security Intelligence Blog, Trend Micro Inc., Dec. 4, 2012, 4 pages.
Lasecki, et al., "Real-Time Crowd Labeling for Deployable Activity Recognition," In Proceedings of the 2013 Conference on Computer Supported Cooperative Work, Feb. 23, 2013, 10 pages.
Kotadia, Munir, "Jamming device aims at camera phones," available at <<http://news.cnet.com/2100-1009-5074852.html>22 , CNET.com, CBS Interactive Inc., Sep. 3, 2003, 4 pages.
Lee, et al., "πBox: A Platform for Privacy-Preserving Apps," Proceedings of the 10th USENIX Symposium on Network Systems Design and Implementation, Apr. 2013, 15 pages.
Likamwa, et al., "Energy Characterization and Optimization of Image Sensing Toward Continuous Mobile Vision," Proceeding of the 11th Annual International Conference on Mobile Systems, Applications, and Services, Jun. 25, 2013, 13 pages.
Lioy, et al., "Trusted Computing," Handbook of Information and Communication Security, Stravroulakis, et al. (Eds.), 2010, 21 pages.
Massimi, et al., "Understanding Recording Technologies in Everyday Life," IEEE Pervasive Computing, vol. 9, Issue 3, Jul. 2010, 8 pages.
Tate, Ryan, "Google Glass Reborn as Something You'd Actually Want to Wear," available at <<http://www.wired.com/business/2013/08/meta_glass/>>, Wired, Aug. 19, 2013, 7 pages.
"Creating Your Own Code Access Permissions," available at <<http://msdn.microsoft.com/en-us/library/yetbsyf4(v=vs.90).aspx>>, Microsoft Developer Network, Microsoft Corporation, Redmond, WA, accessed on Jan. 20, 2013, 2 pages.

O'Brien, Kevin, "Swiss Court Orders Modifications to Google Street View," available at <<http://www.nytimes.com/2012/06/09/technology/09iht-google09.html?_r=0>>, New York Times, Jun. 8, 2012, 3 pages.
Paruchuri, et al., "Video Data Hiding for Managing Privacy Information in Surveillance Systems," EURASIP Journal on Information Security, Article No. 7, 2009, 18 pages.
Priyantha, et al., "The Cricket Compass for Context-Aware Mobile Applications," In Proceedings of 7th Annual International Conference on Mobile Computing and Networking, 2001, 14 pages.
Sorrel, Charlie, "Word Lens: Augmented Reality App Translates Street Signs Instantly," available at <<http://www.wired.com/gadgetlab/2010/12/word-lens-augmented-reality-app-translates-street-signs-instantly/>>, Wired, Dec. 17, 2010, 4 pages.
"RunKeeper," available at <<http://en.wikipedia.org/wiki/RunKeeper>>, accessed on Jan. 20, 2014, Wikipedia online article, 2 pages.
"After Modifications, Google Street View Approved for Switzerland," available at <<http://yro.slashdot.org/story/12/06/09/1645213/after-modifications-google-street-view-approved-for-switzerland>>, Soulskill, Slashdot, Jun. 9, 2012, 14 pages.
Tennenhouse, et al., "A Survey of Active Network Research," In IEEE Communications Magazine, vol. 35, Issue 1, 1997, 7 pages.
"Google Glasses Banned," available at <<http://the5pointcafe.com/google-glasses-banned/>>, The 5 Point Café, Mar. 11, 2013, 4 pages.
Simonite, Tom, "Bringing Cell-Phone Location-Sensing Indoors," available at <<http://www.geoconnexion.com/articles/bringing-cell-phone-location-sensing-indoors/>>, accessed on Jan. 20, 2013, GeoConnexion, 3 pages.
Whitney, Lance, "Google Glass Code Lets You Snap a Photo with a Wink," available at <<http://news.cnet.com/8301-1023_3-57582500-93/google-glass-code-lets-you-snap-a-photo-with-a-wink/>>, May 2, 2013, CNET.com, CBS Interactive Inc., 21 pages.
Beresford, Alastair R., "Location Privacy in Ubiquitous Computing," available at <<http://www.cl.cam.ac.uk/research/dtg/www/publications/public/arb33/UCAM-CL-TR-612.pdf, Technical Report 612, 2005, University of Cambridge Computer Laboratory, Cambridge, UK, 139 pages.
Liao, Tony, "A Framework for Debating Augmented Futures: Classifying the Visions, Promises and Ideographs Advanced About Augmented Reality," Proceedings of the IEEE International Symposium on Mixed and Augmented Reality, Nov. 5, 2012, 10 pages.
Gruteser, et al., "Privacy-Aware Location Sensor Networks," Proceedings of the 9th Workshop on Hot Topics in Operating Systems, 2003, 6 pages.
Ferreira, et al., "Security and Privacy in a Middleware for Large Scale Mobile and Pervasive Augmented Reality," In Proceedings of International Conference on Software, Telecommunications and Computer Networks, 2007, 5 pages.
Wang, et al., "Computerized-Eyewear Based Face Recognition System for Improving Social Lives of Prosopagnosics," In Proceedings of the Conference on Pervasive Computing Technologies for Healthcare and Workshops, Mar. 2013, 4 pages.
Dabrowski, et al., "Framework based on Privacy Policy Hiding for Preventing Unauthorized Face Image Processing," Nov. 20, 2013, 7 pages.
Kohno, et al., "World-Driven Access Control Using Trusted Certificates," U.S. Appl. No. 14/166,774, filed Jan. 28, 2013, 79 pages.
Response filed Nov. 27, 2015 to Final Office Action mailed Sep. 4, 2015 from U.S. Appl. No. 14/166,774, 14 pages.
International Preliminary Report on Patentability mailed Nov. 20, 2015 from PCT Patent Application No. PCT/US2014/053963, 18 pages.
Notice of Allowance mailed Sep. 16, 2015 from U.S. Appl. No. 14/020,708, 7 pages.
Corrected Notice of Allowability mailed Sep. 25, 2015 from U.S. Appl. No. 14/020,708, 2 pages.
Final Office Action mailed Sep. 30, 2015 from U.S. Appl. No. 14/020,723, 17 pages.
Applicant—Initiated Interview Summary mailed Dec. 14, 2015 from U.S. Appl. No. 14/020,723, 4 pages.

(56) References Cited

OTHER PUBLICATIONS

International Preliminary Report on Patentability mailed Nov. 24, 2015 from PCT Patent Application No. PCT/US2014/053771, 8 pages.
Notice of Allowance mailed Dec. 18, 2015 from U.S. Appl. No. 14/020,708, 13 pages.
Response and After Final Consideration Pilot Program Request filed Dec. 28, 2015 to the Final Office Action mailed Sep. 30, 2015 from U.S. Appl. No. 14/020,723, 13 pages.
Allowance, AFCP 2.0 Decision and Examiner-Initiated Interview Summary and After Final Consideration Program Decision mailed Jan. 14, 2016 from U.S. Appl. No. 14/020,723, 20 pages.
Response and Demand filed Mar. 13, 2015 to International Search Report and Written Opinion mailed Dec. 1, 2014 from PCT Patent Application No. PCT/US2014/053771, 17 pages.
Corrected Notice of Allowability mailed Jan. 14, 2016 from U.S. Appl. No. 14/020,708, 6 pages.
Brassil, Jack, "Technical Challenges in Location-Aware Video Surveillance Privacy," HP Laboratories, Report No. HPL-2008-213, Hewlett-Packard, Palo Alto, CA, 2008, 23 pages.
Zimmerman, P.R., "The Official PGP User's Guide," MIT Press, Cambridge, MA, 1995.
Notice of Allowance mailed Mar. 17, 2016 from U.S. Appl. No. 14/020,708, 12 pages.
Corrected Notice of Allowability mailed Apr. 28, 2016 from U.S. Appl. No. 14/020,708, 6 pages.
Notice of Allowance mailed Apr. 18, 2016 from U.S. Appl. No. 14/020,723, 14 pages.
Corrected Notice of Allowability mailed Apr. 28, 2016 from U.S. Appl. No. 14/020,723, 6 pages.
Official Communication pursuant to Rule 161 mailed Apr. 13, 2016 from European Patent Application No. 14771666.6, 2 pages.
Response filed Jun. 3, 2016 to the Official Communication pursuant to Rule 161 mailed Apr. 13, 2016 from European Patent Application No. 14771666.6, 24 pages.
Non-Final Office Action mailed May 24, 2106 from U.S. Appl. No. 14/166,774, 55 pages.

\* cited by examiner

FEATURES: 602
- INFORMATION REGARDING THE WHITEBOARD
- INFORMATION REGARDING THE WRITING ON A WHITEBOARD
- INFORMATION REGARDING THE QR CODE ON THE WHITE BOARD
- INFORMATION REGARDING THE "NO RECORDING" MESSAGE ON THE WHITEBOARD
- ETC.

FINDINGS REGARDING THE WHITEBOARD OBJECT: 604
- CERTAIN IMAGE-RELATED FEATURES MAP TO A WHITEBOARD OBJECT
- THE QR CODE IS ASSOCIATED WITH THE WHITEBOARD, AND IT MAPS TO POLICY P1
- THE "NO RECORDING" MESSAGE IS ASSOCIATED WITH THE WHITEBOARD AND IT MAPS TO POLICY P2
- AUTHENTICITY AND AUTHORIZATION CHECKS FOR THE QR CODE AND THE MESSAGE INDICATE THAT THESE ARE VALID POLICY DESIGNATORS
- THE WHITEBOARD IS OWNED BY ENTITY Z
- ENTITY Z IS ASSOCIATED WITH POLICY P3
- THE WHITEBOARD IS IN ROOM R1 IN BUILDING B1
- ROOM R1, BUILDING B1, IS ALSO ASSOCIATED WITH POLICY P4
- AN APPLICABLE STANDARD POLICY IS P5
- AN APPLICABLE USER POLICY IS P6
- ETC.

RESOLVED FINAL POLICIES:
- NO APP IS ALLOWED CAPTURE AN IMAGE OF THE WRITING, UNLESS THAT APPLICATION IS ASSOCIATED WITH ENTITY Z. NO USER-SPECIFIED POLICY OVERRIDES THIS RULE.
- ETC. 606

SET PERMISSIONS:
- THE ANNOTATION APPLICATION IS ALLOWED TO READ THE WRITING BECAUSE IT DOES NOT DIRECTLY READ RGB DATA
- THE TRANSCRIPTION APPLICATION IS ALLOWED TO READ THE WRITING BECAUSE IT IS ADMINISTERED BY ENTITY Z
- THE TRANSCRIPTION APPLICATION, HOWEVER, IS NOT ALLOWED TO SHARE THE WRITING WITH THE ANNOTATION APPLICATION
- ETC. 608

FIG. 6

WORLD-DRIVEN ACCESS CONTROL

BACKGROUND

An augmented reality application provides an output presentation which combines information captured from the environment with some type of supplemental information. For example, one type of augmented reality application presents an image of the environment, together with labels that annotate objects within the image. Another type of augmented reality application provides a figure which duplicates the actual movement of a human user, together with a virtual object with which the user may interact.

Any application that captures information from the surrounding environment raises privacy concerns. For example, the above-described augmented reality applications capture images or videos of the environment; that information, in turn, can potentially include sensitive items, such as human faces, personal writing, account numbers, etc. The "owner" of this private information will often prefer or insist that the information is not released to unauthorized parties. Such an undesirable release can occur in various circumstances. In a first case, an unauthorized application may extract the private information from data that it obtains through a computing device's sensing mechanisms (e.g., a video camera, microphone, etc.). In a second case, an unauthorized application may obtain the private information from another augmented reality application.

The above-described privacy concerns are not unique to augmented reality applications, but extend to any application which captures perceptual information from the environment. Such applications are referred to herein as environment-sensing applications.

In practice, a developer may create an augmented reality application as a "one-off" self-contained unit of code. Similarly, a computing device may execute the application as a standalone unit of functionality. Pursuant to this approach, each developer may address the above-described privacy concerns in a separate—typically ad hoc—manner, within the application code itself

SUMMARY

Functionality is described herein for managing the behavior of one or more applications, such as augmented reality applications and/or other environment-sensing applications. The functionality defines permission information in a world-driven manner, which means that the functionality uses a trusted mechanism to identify cues in the sensed environment and then maps those cues to permission information. The functionality then uses the permission information to govern the operation of one or more applications. This approach can also be considered as application-agnostic insofar as it provides a general platform that can be used by any application, rather than, or in addition to, relying on each application to handle privacy issues in an ad hoc and application-centric manner.

The above approach can be manifested in various types of systems, components, methods, computer readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 6 describes an example of the operation of the management module of FIG. 3, as applied to the scenario shown in FIG. 1.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes an illustrative reality-sensing framework in which permission information that governs the operation of applications is principally dictated by cues within a sensed environment. Section B sets forth illustrative methods which explain the operation of the functionality of Section A. Section C describes illustrative computing functionality that can be used to implement any aspect of the features described in Sections A and B.

Figure 12:
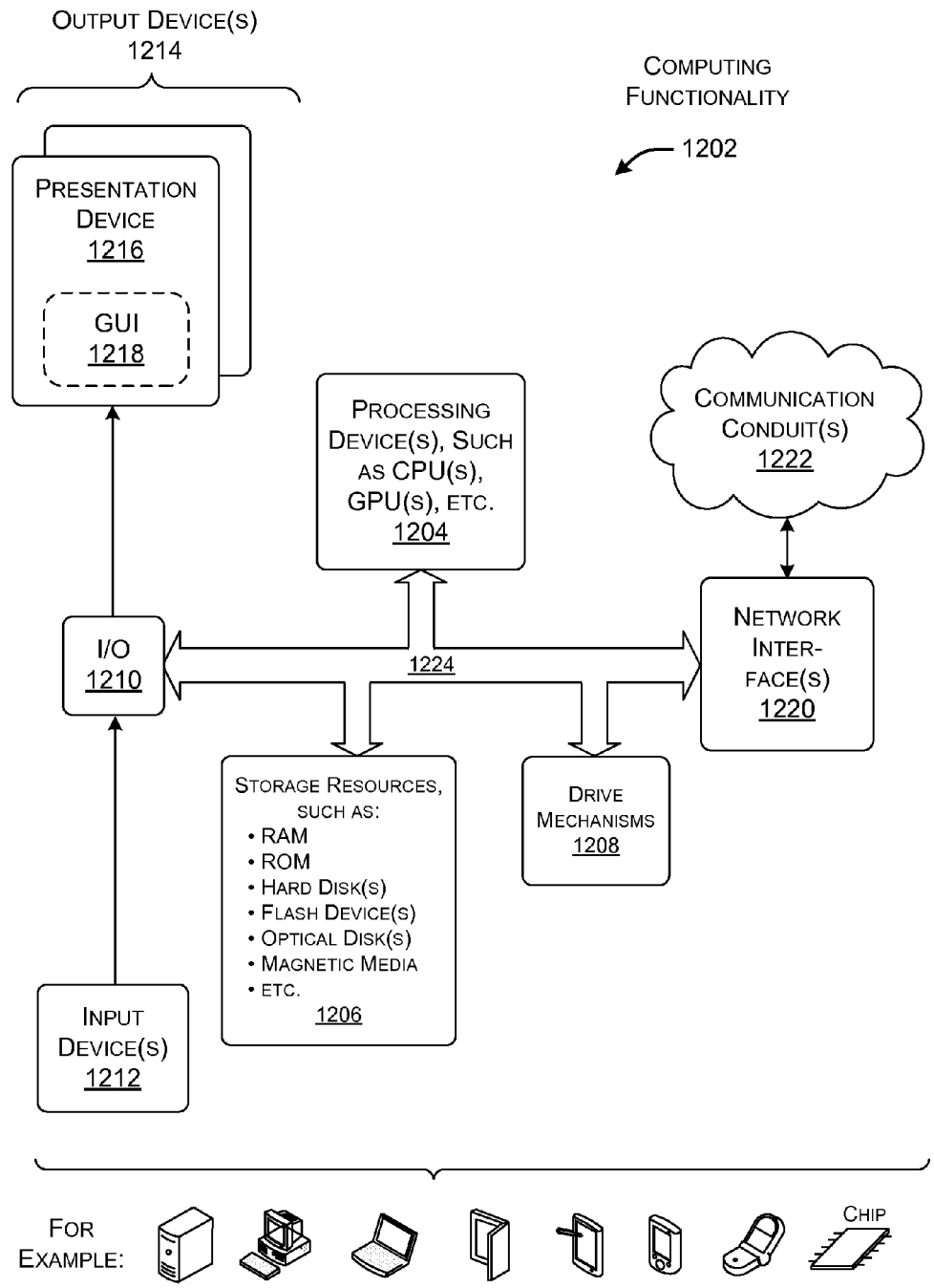
FIG. 12 shows illustrative computing functionality that can be used to implement any aspect of the features shown in the foregoing drawings.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. FIG. 12, to be described in turn, provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

The phrase "means for" in the claims, if used, is intended to invoke the provisions of 35 U.S.C. §112, sixth paragraph. No other language, other than this specific phrase, is intended to invoke the provisions of that portion of the statute.

The following explanation may identify one or more features as "optional." This type of statement is not to be interpreted as an exhaustive indication of features that may be considered optional; that is, other features can be considered as optional, although not expressly identified in the text. Finally, the terms "exemplary" or "illustrative" refer to one implementation among potentially many implementations.

A. Illustrative Reality-Sensing Framework

This section describes a reality-sensing framework that hosts one or more augmented reality applications. As noted above, an augmented reality application operates by using one or more sensing mechanisms to capture any aspects of an environment. The application then generates some kind of added information, such as a label, virtual object (e.g., an avatar), etc. The application then provides an output presentation which combines information regarding the environment with the added information.

In other cases, the reality-sensing framework may host one or more other types of environment-sensing applications. These other types of environment-sensing applications capture aspects of the environment, but do not combine a representation of the environment and added information in the same manner described above. Nevertheless, to facilitate and simplify the description, the reality-sensing framework will be principally described with reference to augmented reality applications.

From a high-level perspective, the reality-sensing framework may include a recognition system for extracting different features from the environment, based on perceptual information provided by one or more sensing mechanisms. Different augmented reality applications subscribe to and receive different types of features provided by the recognition system, if permitted by per-application permission information. The per-application permission information, in turn, is generated based on detected cues in the environment. A shared renderer receives and manages information generated by all of the augmented reality applications.

Figure 1:
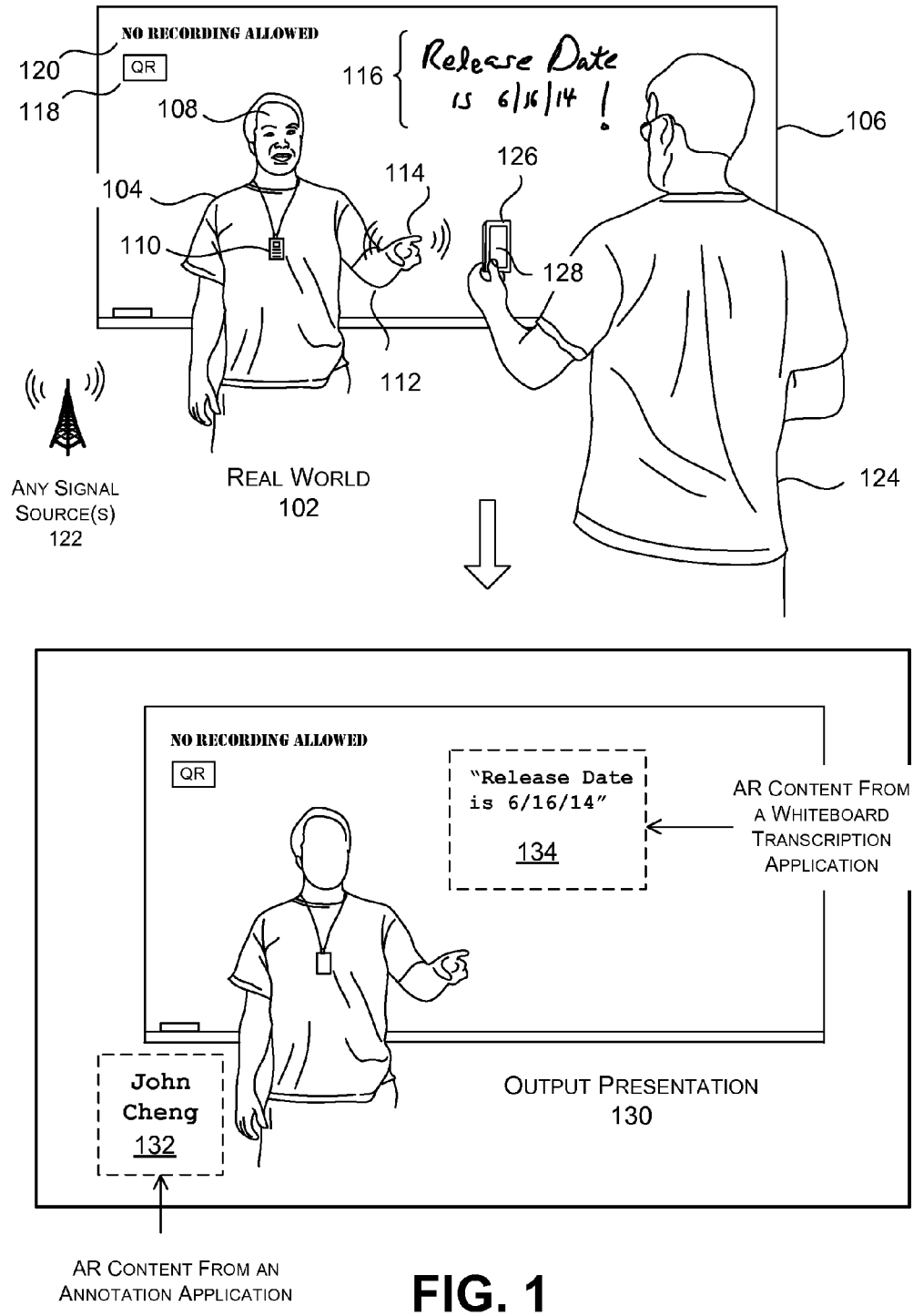
FIG. 1 shows an illustrative scenario in which a reality-sensing framework captures information from an environment, including information regarding various policy-specific features that map to candidate policies.

But before delving into the illustrative specifics of the reality-sensing framework, consider the illustrative scenario depicted in FIG. 1, in which the reality-sensing framework is used to provide an augmented reality experience. That scenario will serve as a running example throughout this disclosure.

The real world 102 shown in FIG. 1 includes a first person 104 who is standing in front of a whiteboard 106. Among other characteristics, the first person 104 possesses a face 108 and a badge 110. Further, the first person 104 adopts a pose in which his arm 112 is outstretched. The real world 102 may also include various events. For example, in one such event, the first person 104 is making a gesture 114 with his outstretched hand, shaking it back and forth as if to signal disapproval. The whiteboard 106 includes writing 116, a code-bearing label 118, and a printed message 120.

The real world 102 also includes one more signal sources 122, such as any source of electromagnetic signals (radio signals, microwave signals, infrared signals, magnetism signals, etc.), sound waves, etc. Some of the signal sources 122 may be local with respect to the immediately sensed environment, such as Wi-Fi access point sources. Other signal sources 122 may be remote, such as radio towers, satellite sources, and so on. The reality-sensing framework can use any technology to process the signals from the sources 122, such as Bluetooth® technology, dead reckoning techniques, triangulation techniques, global position detection techniques, and so on.

A second person 124 captures the above-described scene using a computing device 126, such as a smartphone, a tablet computing device, etc. More specifically, the second person 124 orients the computing device 126 such that its video camera (not shown) captures a video representation of at least the first person 104 and the whiteboard 106. The computing device 126 can also include one or more other environment sensing mechanisms, such as, but not limited to, one or more microphones, one or more motion sensing devices (such as one or more accelerometers, one or more gyroscopes, etc.), and so on. These other sensing mechanisms may capture other aspects of the real world 102.

The computing device 126 may also include one or more output devices, such as a display mechanism 128. The display mechanism 128 provides an output presentation produced by the augmented reality application(s) that are running at a current time. In the scenario shown in FIG. 1, the display mechanism 128 acts as a "window" to the real world 102, from the vantage point of the second person 124. In other words, the content presented on the display mechanism 128 mirrors the actual world in front of the computing device 126, as if the user was looking through a window onto the world.

In the case of FIG. 1, the second person 124 points the computing device 126 such that the field of view of the video camera is directed away from the second person 124. But other arrangements may be used to deliver an augmented reality experience. In another case, for instance, the second person 124 may operate within a field of view associated with plural video cameras, which capture the second person 124 from different vantage points. The second person 124 may consume the output presentation produced by the augmented reality applications on any output device, such as a display monitor (not shown) that is placed generally in front of the second person 124.

In another case, the second person 124 may interact with the augmented reality applications via any type of wearable computing device. For example, such a computing device may be affixed to eyewear, apparel, a watch, jewelry, a badge, or other wearable item. Any type of sensing mechanisms and output devices may be affixed or otherwise associated with the wearable item. For example, a video camera affixed to eyewear can capture a video representation of the scene in front of the second person 124, while a display mechanism affixed to the eyewear may deliver the output presentation provided by the augmented reality applications. The above-described form factors are cited by way of example, not limitation; still other arrangements are possible.

Assume, in the present example, that the reality-sensing framework includes two augmented reality applications that work together. They work together in the sense that they sense the same real world 102, and they generate added information which contributes to the same output presentation 130.

Assume that a first augmented reality application receives face recognition data from the recognition system, associated with one or more faces that appear in the real world 102 (if permitted by the permission information). The first augmented reality application then performs a lookup operation to match the face recognition data with one or more previously-registered instances of face recognition data, each of which is tagged with a name. The first augmented reality application then provides labels associated with one or more matching names on the output presentation 130. FIG. 1 shows one such label 132 generated by the first augmented reality application. The first augmented reality application is referred to hereinafter as an annotation application.

A second augmented reality application receives raw video information from the recognition system (if permitted by the permission information). The second augmented reality application then recognizes text in the video information, if present. The second augmented reality application then replaces the original text with a beautified version of the original text, such as the instance of replacement text 134. The second augmented reality application is referred to hereinafter as a transcription application.

As can be appreciated, the assortment of augmented reality applications described above is cited by way of illustration, not limitation. The reality-sensing framework can accommodate any number of augmented reality applications (or more generally, any environment-sensing applications), each of which may perform any function, and each of which may be active or inactive at any time.

Note that the output presentation 130 also includes a redacted depiction of the first person 104 and the whiteboard 106. The reality-sensing framework can present such a depiction in different ways, to be described below.

Consider a few high-level aspects of the problem posed by the scenario shown in FIG. 1. The real world 102 includes several items which may be considered private or sensitive in nature. For example, the whiteboard 106 contains writing that may contain secret information. For example, consider the case in which the first person 104 is an employee of a company, and that person has written the launch date of a commercial product (as conveyed by writing 116) on the whiteboard 106, which is located within the premises of the company. The company may wish to prevent that information from being released outside the company.

Similarly, the real world 102 encompasses the first person 104 himself. That person 104 may consider his face 108, speech, badge 110, etc. as private information. As such, the first person 104 may wish to prevent these personal items from being communicated to non-authorized entities. These privacy concerns may be particularly pronounced in those environments in which heightened privacy usually applies, such as bathrooms, locker rooms, nightclubs, doctor's offices, and so on.

Note that, in the scenario of FIG. 1, the second person 124 is capturing a representation of the first person 104. This arrangement means that the first person 104 will be the one who is primarily concerned about the release of sensitive information. But more generally, anyone who is encompassed or otherwise impacted by a sensed environment may be concerned about breaches of privacy, including the second person 124 himself.

Private information can be jeopardized through various mechanisms in the above-described scenario. First, a potentially malicious application may directly receive private information. In some cases, the application may not even need the private information to perform its allotted task. Second, an application which has been given private information (either rightfully or wrongfully) can share the private information with another entity in an inappropriate manner. For example, the annotation application may attempt to share the detected name (i.e., "John Cheng") with another application. Third, an application may provide sensitive information to output devices, such as by displaying the face 108 of the first person 104, etc. on the display mechanism 128 of the computing device 126.

Figure 2:
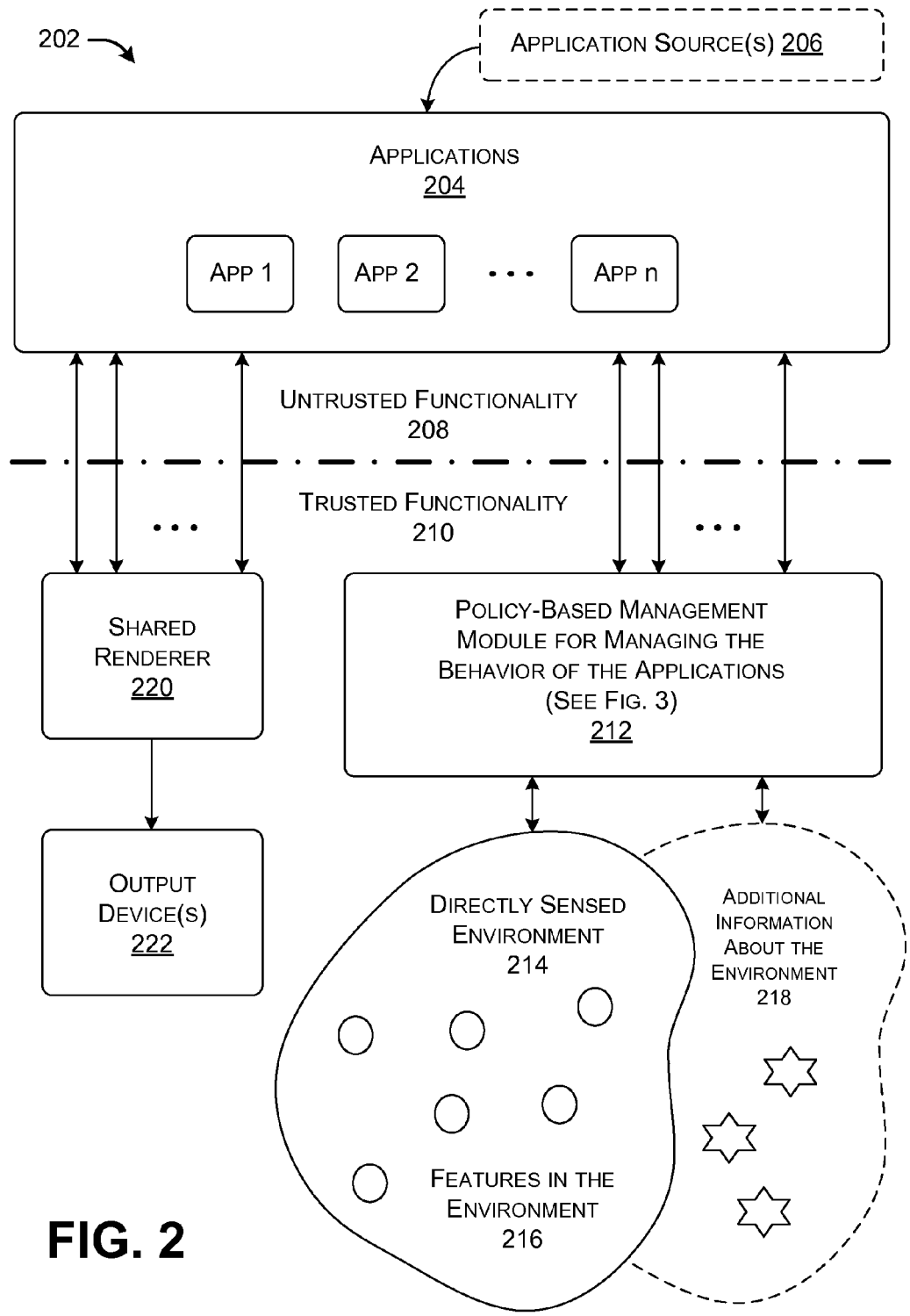
FIG. 2 shows an overview of an illustrative reality-sensing framework for delivering the experience shown in FIG. 1.

Advancing to FIG. 2, this figure shows a reality-sensing framework 202 which provides a solution to at least the above-described problems. The reality-sensing framework 202 includes a collection of one or more augmented reality applications 204 and/or any other environment-sensing applications. The reality-sensing framework 202 may receive the applications 204 from any source(s) 206 in any manner. In one case, a user can explicitly download or otherwise obtain an augmented reality application from any source, such as an online marketplace of such applications. In another case, a user may more passively select an application, such as by visiting an online website which invokes the application, or by triggering any other event which automatically invokes the application. An application corresponds to a body of computer-implemented instructions, expressed in any computing language or combination of computing languages.

The applications 204 correspond to potentially untrusted functionality 208. The remainder of the reality-sensing framework 202 corresponds to trusted functionality 210. The untrusted functionality 208 is untrusted in the sense that it does not offer the same type of robust security guarantees as the trusted functionality 210. In one case, the trusted functionality 210 may be implemented, at least in part, by functionality provided by a computing device's operating system. In another case, the trusted functionality 210 can be provided, at least in part, by software which resides between the operating system and the applications 204. Still other implementations of the trusted functionality 210 are possible.

The trusted functionality 210 includes two main flows of information. In the first main flow, a policy-based management module 212 (henceforth, simply "management module") receives information from a sensed environment 214.

The environment 214 is characterized by various sensed features 216 (to be described in greater detail below). The management module 212 may also receive supplemental information 218 that pertains to the environment 214, from one or more additional sources (such as databases, etc.). Based on this information, the management module 212 determines one or more policies that are appropriate to govern the behavior of the applications 204. In a second main flow, the applications 204 provide output information to a shared renderer 220. The shared renderer 220 updates shared state information based on the output information. The shared renderer 220 then generates an output presentation based on the shared state information, which it provides to one or more output devices 222, such as the display mechanism 128 of FIG. 1.

A policy can control different aspects of the behavior of any application. For example, a policy may specify the type of information that an application is permitted to read from the environment 214. In addition, or alternatively, a policy may govern the information that one application is allowed to share with another application, or another entity. In addition, or alternatively, a policy may govern the information that an application is allowed to send to an output device, such as the display mechanism 128. In addition, or alternatively, a policy may govern code that an application is allowed to execute, and so on.

From a high-level perspective, the reality-sensing framework 202 uses the trusted functionality 210 to determine policies based on cues within the environment 214. In this sense, the reality-sensing framework 202 may be said to provide a world-driven policy specification. Further, while the policies are ultimately applied to the applications 204, many of the policies do not have a one-to-one correspondence with any specific applications. In this sense, the reality-sensing framework 202 may be considered, at least in part, application-agnostic in nature.

The approach summarized above has various benefits over an application-centric approach to specifying policies. First, the world-driven approach is potentially more useful compared to an application-centric approach because it applies to a large number of applications, and can be used in a variety of environments. By contrast, application-centric solutions may narrowly apply to specific applications which operate in specific circumstances. Second, the world-driven approach is less likely to fail compared to an application-specific approach. This characteristic may ensue from the fact that the world-driven approach involves the collection and analysis of a wide variety of potentially redundant cues in the environment. In contrast, each application-centric solution may operate based on the detection of a specific triggering circumstance. Third, the world-driven approach is more standardized than an application-centric approach. This factor may promote structured improvements and expansions of the approach by application developers and device manufacturers. Fourth, the world-driven approach is potentially more trustworthy compared to application-centric solutions. This factor is due to the fact that the world-driven approach uses trusted functionality 210, rather than relying on one-off untrusted application functionality. The above-described benefits are cited by way of example, not limitation.

Further, the reality-sensing framework 202 chooses policies in an automated or semi-automated manner, as the user interacts with the environment 214. This aspect reduces the burden on the user in dealing with privacy issues. In contrast, in a prompt-driven approach, a user may be asked to specify whether to grant or deny permissions on a fine-grained basis, each time an application makes a request to read environmental data. In a traditional manifest-driven approach, a user may be asked to grant or deny permissions at the time that the application is installed; yet the user may not fully understand the nature of the actual permissions that he or she is granting to the application. (Nevertheless, the world-driven approach can be combined with aspects of a prompt-driven approach and/or a manifest-driven approach.)

Taken together, the above-described benefits of the reality-sensing environment may promote the acceptance of augmented reality applications and devices (and other environment-sensing applications and devices) in everyday environments. For instance, the standardized and trusted nature of the platform may help alleviate fears about the capabilities of augmented reality applications, making end users, bystanders, proprietors, etc. less likely to reject the applications out of hand.

Figure 3:
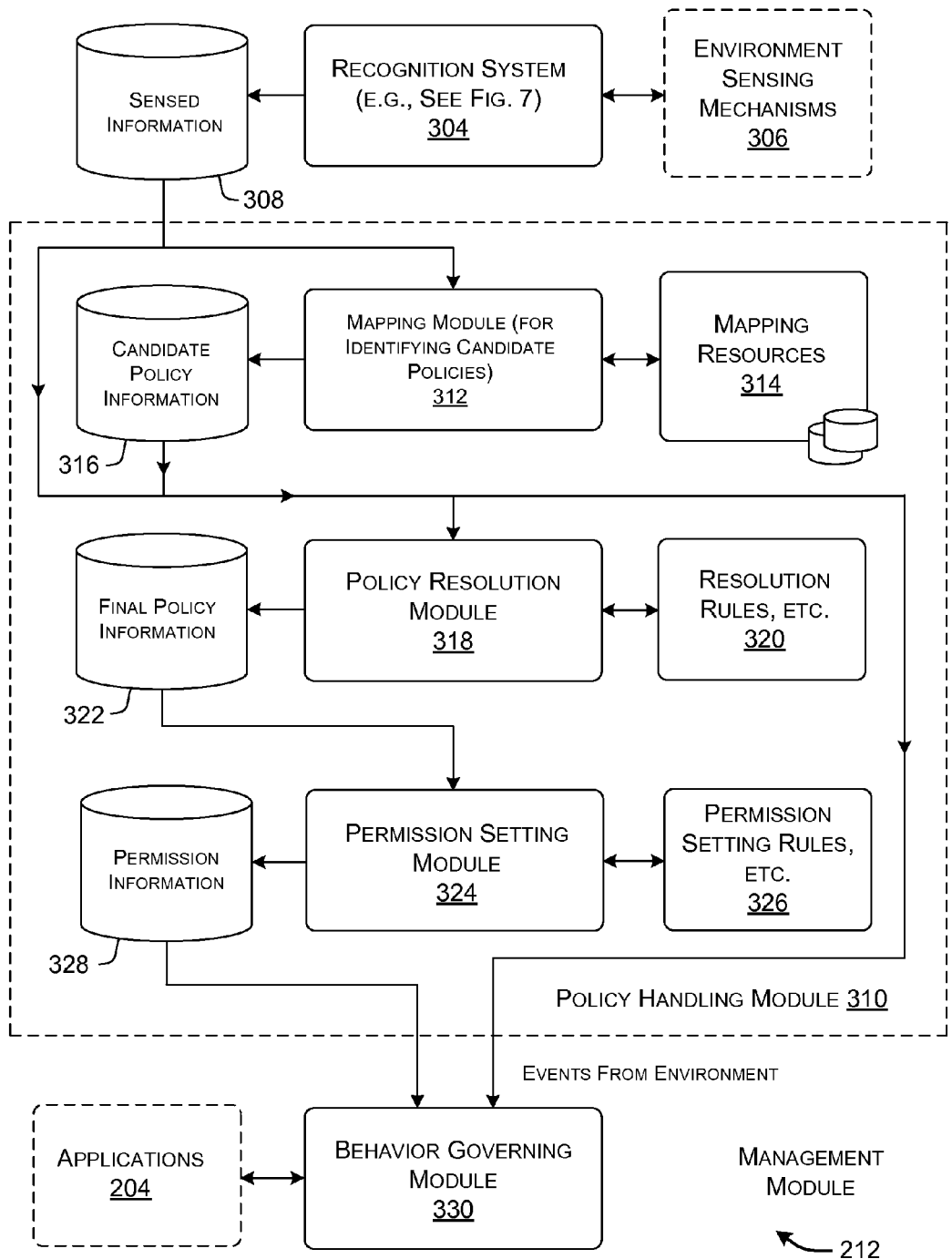
FIG. 3 shows one illustrative implementation of a management module, which is a component of the reality-sensing framework of FIG. 2.
Figure 10:
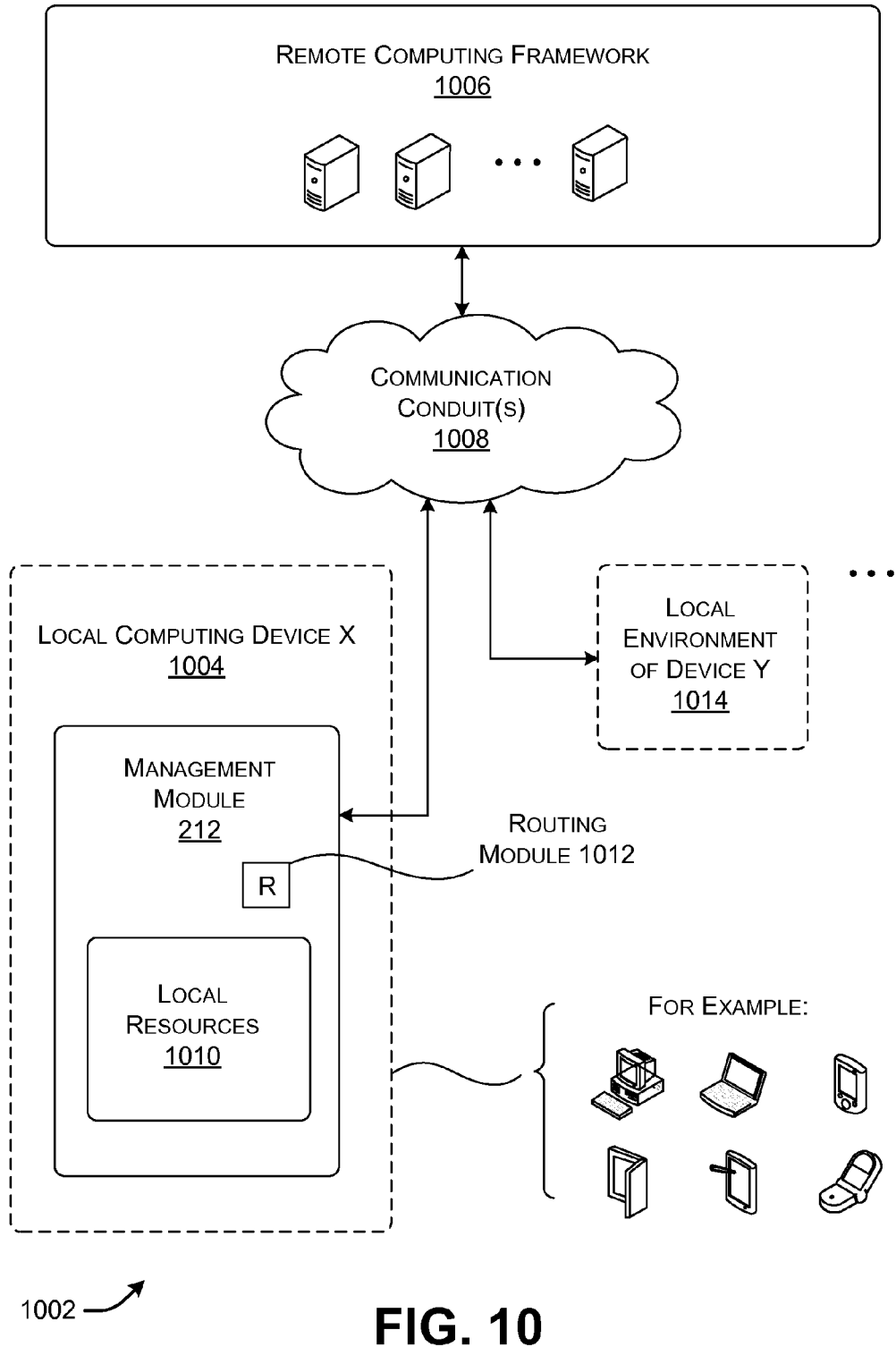
FIG. 10 shows illustrative distributed computing functionality for implementing the reality-sensing framework of FIG. 2.

FIG. 3 shows one implementation of the management module 212 of FIG. 2. The management module 212 includes, or can be conceptualized as including, different components that perform different respective functions. The components may be located at the same site or distributed over plural sites. FIG. 10, to be described in turn, provides additional information regarding one implementation of the management module 212.

Starting at the top of the figure, the management module 212 includes a recognition system 304 for identifying the features 216 in the environment 214. To perform this task, the recognition system 304 can receive perceptual information from one or more environment sensing mechanisms 306. Illustrative environment sensing mechanisms 306 include, but are not limited to, one or more video cameras, one or more microphones, one or more movement sensing devices (e.g., one or more accelerometers, gyroscopes, etc.), one or more tactile input devices, one or more vibration sensing devices, and so on. The raw perceptual information may correspond to relatively low-level features associated with the sensed environment 214.

In addition, the recognition system 304 can optionally extract additional higher-level features from the perceptual information. For instance, the recognition system 304 may include one or more recognizers, each of which generates one or more higher-level features (compared to the raw perceptual information). The recognition system 304 can store all information that is collects in a data store 308. Such information is referred to herein as sensed information.

A policy handling module 310 generates permission information based on the sensed information. That permission information governs the operation of one or more applications 204. The policy handling module 310, in turn, includes different components that perform different respective functions.

First, a mapping module 312 operates to map the sensed information into one or more candidate policies. Each candidate policy may have at least two components. A first component identifies one or more aspects in the sensed environment to which the candidate policy pertains. Each such aspect is referred to herein as an object. A second component refers to a privacy-related stance with respect to the object(s). For example, in the case of FIG. 1, one object pertains to information regarding the writing 116 on the whiteboard 106. A candidate policy regarding that object may specify that no application is allowed to capture raw video that expresses the writing 116. Each such policy is qualified as being a "candidate" policy because it is provisional; in other words, at this stage, the policy handling module 310 has not yet decided to apply the candidate policy to the object in question. To perform the above-described tasks, the mapping module 312 relies on one or more mapping resources 314. The following description will provide additional details regarding different possible implementations of mapping resources 314.

The mapping module 312 stores candidate policy information in a data store 316, which reflects the outcome of its processing. For instance, the candidate policy information may identify a plurality of recognized objects in the environment, with each object being tagged with one or more candidate policies and/or other property information.

A policy resolution module 318 chooses a policy for each object, e.g., by selecting from among a set of two or more candidate policies associated with each recognized object. To perform this task, the policy resolution module 318 relies on resolution rules 320. The resolution rules 320 may identify one or more strategies for choosing from among conflicting candidate policies. The policy resolution module 318 then stores final policy information in a data store 322. The final policy information may identify a list of sensed objects in the environment and a final policy associated with each object, if a policy can be determined.

A permission setting module 324 sets permissions for each application, for each object, based on the final policy information. To perform this task, the permission setting module 324 may rely on permission setting rules in the data store 326. The permission setting module 324 stores the outcome of its processing in a data store 328, which constitutes permission information.

Finally, a behavior governing module uses the permission information to govern the behavior of each application. As noted above, any aspect of the behavior of an application can be controlled.

Figure 4:
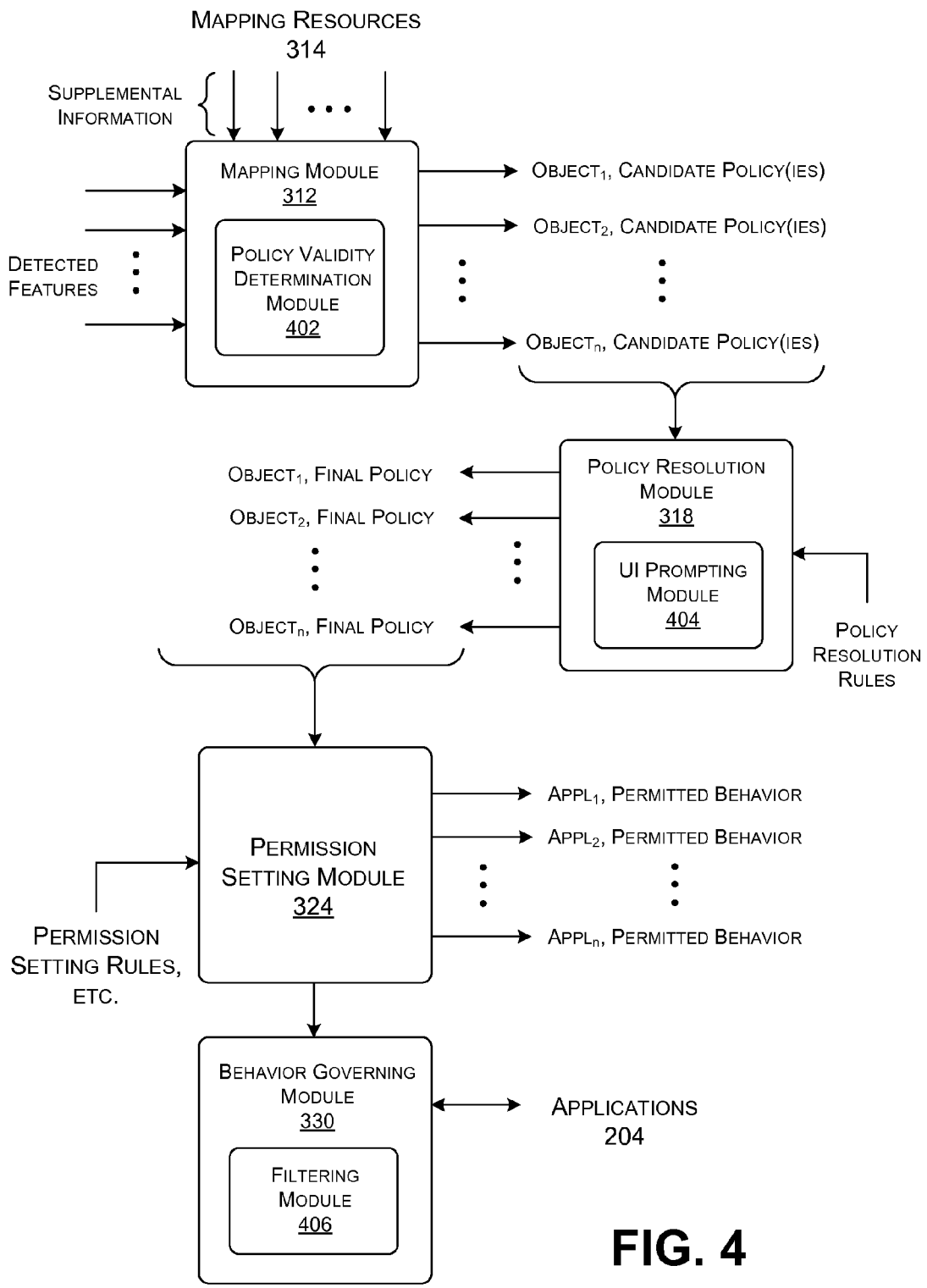
FIG. 4 shows one illustrative implementation of a mapping module, a policy resolution module, a permission setting module, and a behavior governing module, which are components of the management module of FIG. 3.

FIG. 4 provides additional information regarding the operation of the management module 212, including the mapping module 312, the policy resolution module 318, the permission setting module 324, and the behavior governing module 330.

The mapping module 312 receives detected features. In the case of FIG. 1, for instance, the features include raw perceptual information regarding the first person 104, the first person's face 108, the first person's badge 110, the first person's gesture 114, the whiteboard 106, the writing 116 on the whiteboard 106, the code-bearing label 118, the message 120, and so on. The features also include any signals received by the signal sources 122. These items constitute relatively low-level features. The features may also include higher-level information extracted by the recognition system 304, such as data representing a recognized face, data representing a recognized body pose, data representing recognized text, data representing a recognized location, data presenting interpreted code-bearing features, etc. These features are cited by way of example, not limitation; the recognition system 304 may offer yet other information that may constitute features.

The mapping module 312 maps the sensed information to candidate policies. As stated above, each candidate policy is directed to application behavior vis-à-vis some recognized object in the environment. In some cases, an object may correspond to a single recognized feature, ranging from a low-level "raw" perceptual item to a higher-level abstract feature (such as a recognized face). In other cases, an object may correspond to an interpretation of a collection of features. An object can also have any spatial scope, e.g., ranging from information about a very small part of the environment to information about a broad setting in which the part appears (such as a room, building, city, etc.).

Figure 5:
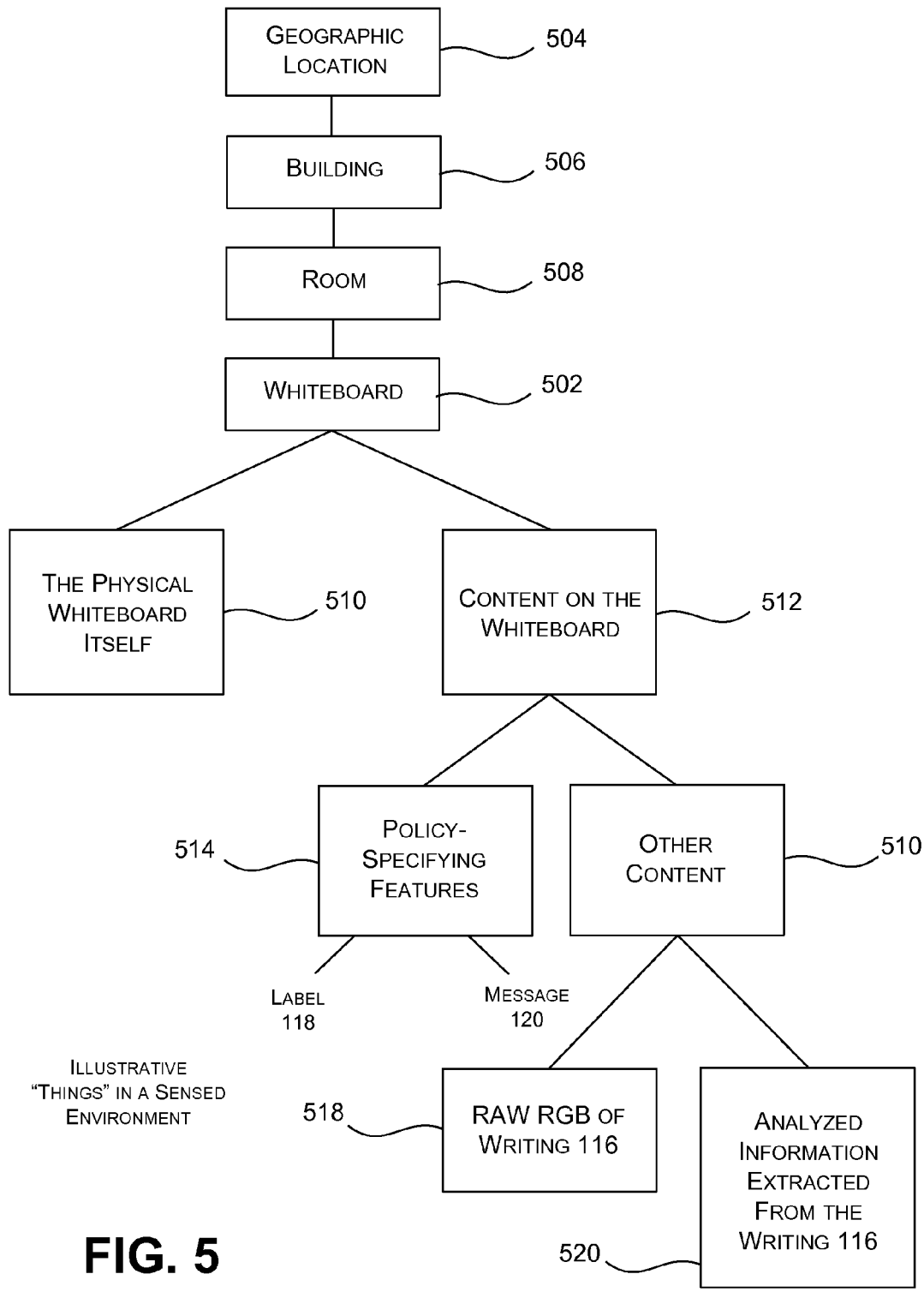
FIG. 5 shows an illustrative collection of objects that pertain to the scenario of FIG. 1.

For example, advancing momentarily to FIG. 5, this figure summarizes a collection of objects associated with the whiteboard 106 of FIG. 1. The actual whiteboard 106 maps to a recognized whiteboard object 502. That whiteboard object 502 occurs in an encompassing context associated with one or more higher-level objects, such as a recognized geographic location object 504 (e.g., associated with a particular city or region), a recognized building object 506, and a recognized room object 508. The whiteboard object 502 also has various "child" objects which pertain to individual aspects of the whiteboard 106. For example, one child object 510 corresponds to the recognized physical characteristics of the whiteboard 106 itself, such as its color, position, size, etc. Another child object 512 corresponds to the recognized information-bearing content presented on the whiteboard 106.

The information-bearing content, in turn, can be further broken down into a policy-specifying object 514 and an "other content" object 516. The policy-specifying object 514 pertains to the recognized policy-specifying features found in the environment, each of which expressly specifies a policy. The policy-specifying features include at least the code-bearing label 118 and the message 120, and possibly one or more of the signal sources 122. The "other content" object 516 pertains to the recognized writing 116 on the whiteboard 106. The "other content" object 516, in turn, can be further broken down into a raw video object 518 and a higher-level object 520. The raw video object 518 may correspond to the recognized raw RGB information provided by a video camera, without further interpretation. The higher-level object 520 may correspond to any higher-level result that is produced by interpreting the raw RGB information, such as interpreted text information, etc.

The mapping module 312 can identify one or more candidate policies for each of the objects in FIG. 5, with the exception of the policy-specifying features. That is, in one implementation, the policy-specifying features serve the purpose of directly specifying candidate policies that apply to other objects in the hierarchy, and are not themselves the "recipient" of policies. But in other cases, one or more policies may be used to qualify the way in which a policy-specifying feature is interpreted.

As can be appreciated, the hierarchy shown in FIG. 5 is presented by way of example, not limitation. Other conceptual breakdowns of the whiteboard 106 can include additional nodes, fewer nodes, and/or different organizations of nodes.

The mapping module 312 can identify candidate policies in different ways, some techniques being more direct than others. In a first approach, the mapping module 312 can use any recognition technology to determine the presence of a particular physical entity in the environment. The mapping module 312 can then determine whether this physical entity is associated with any candidate policy or polices. The candidate policy may apply to a recognized object associated with the physical entity and/or to other recognized objects in the environment. For example, the mapping module 312 can use image recognition technology to detect the presence of a sink or a toilet in the environment. The mapping module 312 can determine that these physical entities are associated with a bathroom environment. The mapping module 312 can then identify one or more candidate policies that apply to a bathroom environment. The objects to which such candidate policies pertain correspond to any informational items that may be obtained within a bathroom environment, or which are otherwise associated with the bathroom environment.

In another case, the mapping module 312 can use any recognition technology to determine the presence of a particular event in the environment. The mapping module 312 can then determine whether this event is associated with any candidate policy or policies. For example, the mapping module 312 can use gesture recognition technology to determine that the first person 104 is wagging his finger back and forth.

The mapping module 312 can then determine whether any candidate policies are associated with this behavior. The object to which such a candidate policy pertains may correspond to information regarding the person who is performing the behavior, or, more generally, all information regarding the immediate environment in which the behavior is performed (including information regarding the whiteboard 106).

Other types of gestures may include a finger to the lips to indicate that no audio recording is allowed, a palms-up halt gesture or arms-crossed gesture to indicate that all recording is forbidden, and so on. Any person associated with a scene may make such a gesture, including the person who is capturing the scene.

Another type of event corresponds to a physical state within the environment, such as a closed or open door in a meeting room, or the act of opening or closing a door to the meeting room. For example, a closed (or closing) door may indicate that privacy is desired. Another type of event may correspond to an utterance or noise made by a person. For example, a person may make a verbal request, specifying that "no recording is allowed." Or a person may make a "shushing" sound to indicate that audio recording is not allowed. Or a person may whisper to indicate that heightened privacy applies, and so on.

In another case, the mapping module 312 can determine the presence of a signal that originates from any of the signal sources 122. The mapping module 312 can then map this signal to one or more candidate policies, if any. More specifically, in some cases, a signal directly identifies a candidate policy. In another case, the mapping module 312 can map the signal source to location (and/or some other property or properties), and then map that intermediate information to one or more candidate policies.

In another case, the mapping module 312 can determine the presence of any policy-specifying feature, which is defined as any detected feature in the environment which is directly associated with a candidate policy. The mapping module 312 then retrieves the candidate policy that is associated with such a feature. For example, as noted above, a signal may be directly associated with a candidate policy, and therefore is one type of policy-specifying feature. The code-bearing label 118 and the message 120 are two other policy-specifying features. In the case of FIG. 1, the label 118 and message 120 are affixed to the whiteboard 106, and therefore pertain to the recognized whiteboard object. In another case (not shown), a person can wear, carry, or otherwise provide an "opt-out" code which indicates that this person does not want any of his personal information to be captured by a computing device. In another case (not shown), private information that appears on a computer screen or in a physical document can contain such an opt-out code.

The above-described methods of mapping features to candidate policies are cited by way of illustration, not limitation. Still other direct and indirect techniques for discovering candidate policies are possible. Generally, in one implementation, it may be advisable to specify a policy using a mode that conforms to the nature of the object that will be protected by the policy. For example, among other possible modes, it may be advisable to use a visible mode to specify a policy for video information, since the video information itself is visible in nature. This choice is potentially useful because a computing device that misses a visual cue may also fail to detect the private visible information that is being protected.

The mapping module 312 can perform the above mapping tasks by relying on one or more mapping resources 314. FIG. 3 depicts the mapping resources 314 as being separate from the recognition system 304. But one or more of the mapping resources 314 can alternatively be implemented by the recognition system 304, e.g., as respective recognizers provided by the recognition system 304. For example, in one case, the mapping module 312 can employ an image recognizer to determine the presence of a recognized whiteboard object in the environment. In another case, the recognizer system 304 can employ a recognizer which performs this function; hence, one of the higher-level features in the sensed information itself may indicate the presence of the whiteboard object.

Without limitation, the mapping resources 314 may include any of the following mechanisms.

Object recognition based on image information. The mapping resources 314 may include pattern recognition technology for processing image information. That is, the pattern recognition technology may operate by probabilistically mapping visual feature information to an identified object. For example, the pattern recognition technology can identify a collection of image-related features as corresponding to a whiteboard object, e.g., based on the presence of a generally flat, rectangular, and white-colored item in the environment. The pattern recognition technology may operate based on a model which is trained using conventional machine learning techniques.

Speech recognition based on audio information. The mapping resources 314 may include audio recognition technology. The audio recognition technology operates by comparing key terms or phrases in the user's speech against a database of salient policy-related phrases. For example, the audio recognition technology may detect whether the user utters the telltale phrase "don't record," or "stop recording me," etc. The speech recognition technology may operate based on a model which is trained using conventional machine learning techniques, e.g., using a training set including a corpus of utterances and accepted interpretations of those utterances.

Gesture recognition. The mapping resources 314 may also include techniques for recognizing the behavior of a person within the environment, or any other event that occurs within the environment. For example, gesture recognition technology can be used to compare the first person's behavior shown in FIG. 1 with a database describing known gestures that have a bearing on whether recording is allowed or prohibited. The gesture recognition technology can apply models that are trained using machine learning technology in a known manner.

Text recognition. The mapping resources 314 may also include a text recognition engine for performing recognition of writing, such as optical character recognition or the like.

Lookup resources. The mapping resources 314 can include one or more lookup tables which map input information to output information. For example, the input information that is fed to a lookup table can correspond to any combination of signal information (obtained from the signal sources 122), location information, ownership information, object information (which identifies a recognized object), and so on. The output information may correspond to any combination of location information, ownership information, object information, candidate policy information, and so on.

Another lookup table can map recognized text messages with one or more candidate policies, e.g., by performing a keyword search based on recognized tokens. Another lookup table can map code-bearing labels with one or candidate policies. For example, the code-bearing label 118 of FIG. 1 may correspond to a Quick Response (QR) code. A lookup table may map information extracted by reading this code to a particular candidate policy, or map the code with a link, which, in turn, is associated with a particular candidate policy.

Further, the lookup tables may be cascaded, such that the output of one lookup table may correspond to an input provided to another lookup table. For example, a first lookup table can map location information to ownership information, and a second lookup table can map ownership information to candidate policy information.

Further, different lookup tables may originate from different policy-setting sources. For example, consider a family of tables, each of which maps location information to a candidate policy. A first table can define policies set by owners associated with detected objects. A second table can define policies set by a standards organization. A third table can define policies set by a local community. A fourth table can define policies set by the user himself or herself (who is operating the computing device which runs the application(s)). Again, this mapping may yield plural candidate policies for a given object.

Tag-to-object mappers. The mapping resources 314 can also include one or more tag-to-object mappers. A tag-to-object mapper associates a policy-specifying feature (such as a signal, code-bearing label, message, etc.) with an object (or plural objects) within the environment to which the feature's candidate policy applies. The tag-to-object mapper can use different techniques to accomplish this task. In one case, the candidate policy itself directly specifies the object to which it pertains. For example, a QR code may be attached to a credit card. That QR code may map to a candidate policy which expressly specifies that it applies to a recognized credit card within the captured scene, or to only certain information obtained from the credit card. In this case, the tag-to-object mapper can examine any information associated with the policy itself to determine the object(s) to which it applies.

In another case, the tag-to-object mapper can make a determination of whether a label or message appears to be affixed to a physical entity, such as the whiteboard 106 of FIG. 1. The tag-to-object mapper can make this determination using video analysis, depth image analysis, and/or other tools. If there is a connection between a tag and a host entity, the tag-to-object mapper can associate the identified policy with any captured information pertaining to the identified host entity.

In another case, the tag-to-object mapper can determine one or more entities that lie within a certain radius of the code-bearing label, message, signal source, or other policy-specifying feature. The tag-to-object mapper can then associate the identified policy with any captured information pertaining to those entities.

Classification resources. The mapping resources 314 can also include one or more classification resources, each of which describes an organization of objects in the world. For example, a particular company may provide a classification resource which describes recognizable objects found in the company's premises, organized in a hierarchy (such as FIG. 5) or other classification scheme. In some circumstances, a "child" object may inherent the properties of its parent and ancestor objects.

In application, the mapping module 312 can consult such a classification resource when assigning properties to objects, such as ownership, candidate policies, etc. For example, the mapping module 312 can assign certain properties to a recognized object because these properties are inherited from a parent object. The mapping module 312 may assign other properties to the same recognized object if its parent object changes, as when a physical entity, corresponding to the recognized object, is moved from one room to another. In other cases, the classification resource may indicate that inheritance does not apply to a particular object. For example, the classification resource may indicate that a personal credit card is to be treated as a highly private article regardless of where it is observed. In other cases, an object may inherit plural candidate policies from two or more parent or ancestor nodes, and those candidate policies may not be consistent.

The mapping module 312 can also include (or have access to) at least one validity determination module 402. That module performs analysis which attempts to determine whether an identified candidate policy is valid or invalid. For example, in the case of FIG. 1, the code-bearing label 118 is attached to the whiteboard 106. That code-bearing label can be invalid for various reasons. In one case, a malicious entity may have applied an invalid label onto the whiteboard 106, e.g., by pasting the invalid label over the valid label.

More specifically, a determination of validity may pose at least two questions. First, the validity determination module 402 may seek to determine whether the identified policy is truly associated with a purported source. Second, the validity determination module 402 may seek to determine whether the purported source is authorized to specify the policy.

The validity determination module 402 can use one or more techniques to assess the validity of a policy. In one technique, a code-bearing label or policy-specifying message or other policy-specifying feature can be associated with a substrate that has properties that are hard to fraudulently duplicate, such as the random edge of a broken substrate or the distribution of participles or fibers within the substrate. The validity determination module 402 can sense this hard-to-duplicate substrate property and compare it with previously-stored information regarding that particular property (in its known valid state). If the current reading differs from the prior reading, then the validity determination module 402 can reject the policy information that is associated with the code-bearing label or message, as the code-bearing label or message is potentially fraudulent.

In another technique, the validity determination module 402 can use crowdsourcing techniques to verify the policy. For example, assume that ten different people use their computing devices to read a particular code-bearing label, and all but one of the individuals receives the same candidate policy in response. The validity determination module 402 can use this finding to reject the outlying candidate policy, or to reject all of the candidate policies. With respect to the outlier reading, the computing device which provides this reading may be under the influence of a virus that is directing the computing device to a malicious site that provides a malicious policy.

In another technique, the validity determination module 402 can use a trusted certificate-granting entity to ensure that online policy information originates from a trusted source. A policy that does not have a trusted certificate may be rejected.

In another technique, the validity determination module 402 can use plural cues in the environment to identify a candidate policy. For example, the mapping module 312 can attempt to detect a policy associated with the whiteboard object by performing image recognition, signal source analysis, interpretation of the code-bearing label 118, interpretation of the message 120, etc. This may yield plural candidate policies. In one case, the mapping module 312 may send all of these candidate policies to the policy resolution module 318, asking that module to pick a final policy to apply to the whiteboard object. But in another case, the validity determination module 402 can preliminarily disqualify one or more policies if there is disagreement among the candidate policies, especially when agreement is strongly expected.

Still other techniques can be used to assess the validity of policy information. The above-cited techniques are described way of illustration, not limitation.

Now advancing to the policy resolution stage of analysis, the policy resolution module 318 can use different techniques to automatically resolve conflicts among candidate policies for an identified object. The policy resolution module 318 can also include a UI prompting module 404. The UI prompting module 404 may invite the user to manually pick an appropriate policy in various circumstances, such as in the case in which the policy resolution module 318 lacks a sufficient basis for automatically choosing among competing policies.

In one technique, each candidate policy is associated with a priority level. The policy resolution module 318 picks the candidate policy with the highest priority level. In another technique, each candidate policy is associated with a level of restrictiveness. For example, a policy that permits an application to receive only face recognition data is more restrictive than a policy that allows the application to receive full video information associated with a face. In the event of a conflict between two candidate policies, then the policy resolution module 318 can choose the most restrictive policy as the final policy.

In certain cases, the policy resolution module 318 gives precedence to a user-specified candidate policy. For example, consider the case in which the user's policy is more restrictive than another candidate policy that has been associated with an object. In one approach, the policy resolution module 318 may automatically choose the user's policy instead of the other policy, since doing so decreases the risk that sensitive information will be undesirably exposed.

Now consider the case in which the user's policy is less restrictive than another candidate policy for a given object. The policy resolution module 318 may use the UI prompting module 404 to notify the user that his or her policy deviates from a world-specified policy, and to ask the user whether he or she wishes to override the world-specified policy. In other cases, the policy resolution module 318 may provide such a prompt only if the other policy is tagged with a "mandatory" policy status (rather than, for example, a "suggested" policy status). In other cases, the policy resolution module 318 may provide a prompt for a "suggested" policy, while prohibiting a user-override for a "mandatory" policy, and so on. In addition, or alternatively, the policy resolution module 318 can override the other policy based on the status of the user who is operating the computing device. For example, a high-level employee may be allowed to override a mandatory policy, whereas a lower-level employee or a known privacy-abuser may not.

The possibility of user override (in some implementations) means that the management module 212 does not prevent a user from purposely violating preferred privacy protocols. Rather, the management module 212 provides a technique which assists a conscientious user in complying with preferred privacy protocols, for both his or her own benefit and for the benefit of other people who are impacted by the user's data collection.

The policy resolution module 318 can also include a learning module (not shown) which learns the types of policies that the user has manually chosen in previous situations. If the policy resolution module 318 becomes suitably confident of the user's preference, it can automatically select the presumed preferred option, or at least display that option in a prominent position in a list of options that is presented to the user. The learning module can also perform user-agnostic learning by modifying any aspect of the management module 212 based any type of feedback provided by plural users who operate plural respective computing devices.

Advancing on, the permission setting module 324 sets permissions for each application, for each object, and for each application behavior that is pertinent to the object. For example, assume that the mapping module 312 discovers that the user is operating a computing device in the locker room of a health club, e.g., based on signal information and/or any other cues associated with that environment, such as image recognition results that indicate the presence of a shower, urinal, etc. Assume that the policy resolution module 318 determines that an appropriate policy for a locker environment prohibits any computing device from capturing any raw video information. In response, the permission setting module 324 can set permissions for each application that is running (or installed) on the computing device; those permissions operate to prohibit each such application from capturing RGB data. The permissions can also be potentially customized for the individual user who is operating the computing device.

More specifically, the permission setting module 324 can set different types of permissions for different types of policies. A first type of policy governs the behavior of an application until an explicit mode-changing event occurs which revokes the policy. For example, upon detecting one type of QR code, the permission setting module 324 can modify the access control rights associated with an application. The permission setting module 324 leaves these rights intact until another policy is specified which revokes the earlier rights. For example, the permission setting module 324 can set certain permissions when a computing device encounters an invoking QR code that is located near the entrance of a bathroom, and can remove those permissions when the computing device encounters a revoking QR code that is located near the exit of the bathroom. A "no recording" policy may remain in place between the two detected events. This type of policy is referred to herein as an out-of-band policy.

A second type of policy governs the behavior of an application only so long as the invoking condition associated with the policy is actively present within the sensed information. For example, the policy handling module 310 can detect a QR code that is affixed to a credit card. The permission setting module 324 can apply the policy to the image content associated with the credit card, but only so long as the QR code is actively sensed by the recognition system 304. In other words, suppose the field of view of the camera drifts such that it no longer captures the QR code on the credit card. The permission setting module 324 will respond by no longer applying the policy associated with the QR code. This type of policy is referred to as an in-band policy, e.g., to indicate that this policy applies only in the presence of a contemporaneous detection of the invoking cue in the environment.

Any out-of-band or in-band policy may be application-agnostic in nature, insofar as it is not specifically designed to serve any particular application. More specifically, any policy may apply to a wide variety of applications, even new applications not yet known at the time that the policy was created. But in some cases, a developer or end-user or any other entity may devise a policy that attempts to target the particular functionality provided by one or more applications. These policies may be referred to as application-specific policies. For example, an application-specific policy can pertain to the collection of a certain high-level feature which is only used in a narrow class of applications.

Advancing now to the bottommost component of FIG. 4, the behavior governing module 330 governs the behavior of the applications 204 based on the permission information.

More specifically, in some cases, the behavior governing module 330 applies the permission information in a binary manner, e.g., by either sending or declining to send an event to an application. That event expresses information about an object to which the applicable policy pertains. For example, if the permission in question prohibits an application from receiving a raw video event, the behavior governing module 330 will enforce this prohibition by blocking the flow of RGB events to the application.

In another case, the behavior governing module 330 carries out a permission using a filtering module 406. The filtering module 406 provides filtered events which express modified objects. For example, assume that an applicable permission states that an application may receive raw video information, but that this video information needs to be redacted to remove the face of any person that is captured in the scene. The filtering module 406 can carry out this instruction in different ways. In one approach, the filtering module 406 can actively redact the video information, e.g., to produce the kind of output presentation 130 shown in FIG. 1. In another case, the recognition system 304 can provide different versions of a feature, such a non-redacted version of the scene and a redacted version of the scene. Here, the filtering module 406 can choose the appropriate version of the feature without performing the actual redaction itself.

In one case, such redacting, wherever performed, can comprise omitting or obscuring pixels that are associated with sensitive content. For example, a redaction recognizer can receive a first input from a face detector recognizer and a second input from a video recognizer which provides raw RGB information. The redaction recognizer can use the face detection results to identify parts of the raw RGB to be removed, blurred, or blocked, etc. It then operates on those parts. In yet more complex cases, the redaction recognizer can determine whether the face data matches instances of face data corresponding to one or more known people. Based the results of this comparison, the redaction recognizer can selectively redact the faces of some people, but not others (such as by removing the faces of strangers, but not friends).

FIG. 6 provides an example of the operation of the management module 212, with respect to scenario shown in FIG. 1. In block 602, the recognition system 304 detects various features of the real world 102. Those features include, but are not limited to, information about the whiteboard 106, information about the writing 116 on the whiteboard 106, information about the code-bearing label 118, information about the message 120, and so on. Those features can correspond to low-level (e.g., raw) features and/or high-level (e.g., abstract) features.

In block 604, the mapping module 312 makes a number of findings based on the sensed information and the supplemental information 218. (The supplemental information, for instance, may correspond to information expressed by various lookup tables, etc., as described above). The findings may indicate that, based on image analysis, the scene contains a whiteboard object, and that the whiteboard object contains writing. Another finding indicates that the code-bearing label 118 is associated with a candidate policy P1. Another finding indicates that the message 120 maps into a candidate policy P2. Another finding indicates that authenticity and authorization checks for the code-bearing label 118 and the message 120 indicate that these are valid policy designators. Another finding indicates that the whiteboard object is owned by entity Z. Another finding indicates that entity Z is associated with policy P3. Another finding indicates that the whiteboard object is located in room R1, and room R1 is located in building B1. Another finding indicates that room R1, in building B1, is associated with policy P4. Another finding indicates that an applicable standards-based policy (e.g., as set by an organization or a local community or establishment) is candidate policy P5. Another finding indicates that an applicable user policy is policy P6, and so on. Hence, the mapping module 312 maps the whiteboard object to candidate policies P1-P6, any two of which may be the same or different.

In block 606, the policy resolution module 318 chooses one of the policies based on policy resolution rules. The chosen policy dictates that no application is allowed to capture an image of the writing 116, unless that application is administered by entity Z, which can be checked by determining whether the application is signed by entity Z's certificate, etc. The user's policy (P6) is not inconsistent with this policy, and therefore does not override the selected policy. This policy may be expressed as an out-of-band policy or an in-band policy. In the former case, the policy remains in effect until removed by an express mode-changing event. In the latter case, the policy remains in effect only so long as the computing device detects the code-bearing label 118, or the message 120, etc.

In block 608, the permission setting module 324 sets permission information that indicates that the annotation application is allowed to read the writing 116 because it does not directly read RGB data. Other permission information indicates that the transcription application is allowed to read the writing 116 because, although it reads RGB data, it is administered by the trusted entity Z, and therefore sufficiently trusted. Other permission information indicates, however, that the transcription application is not allowed to share information extracted from the writing 116 with the annotation application or any other entity.

As can be appreciated, the findings, candidate policies, and permission information described in FIG. 6 are presented by way of illustration, not limitation.

Figure 7:
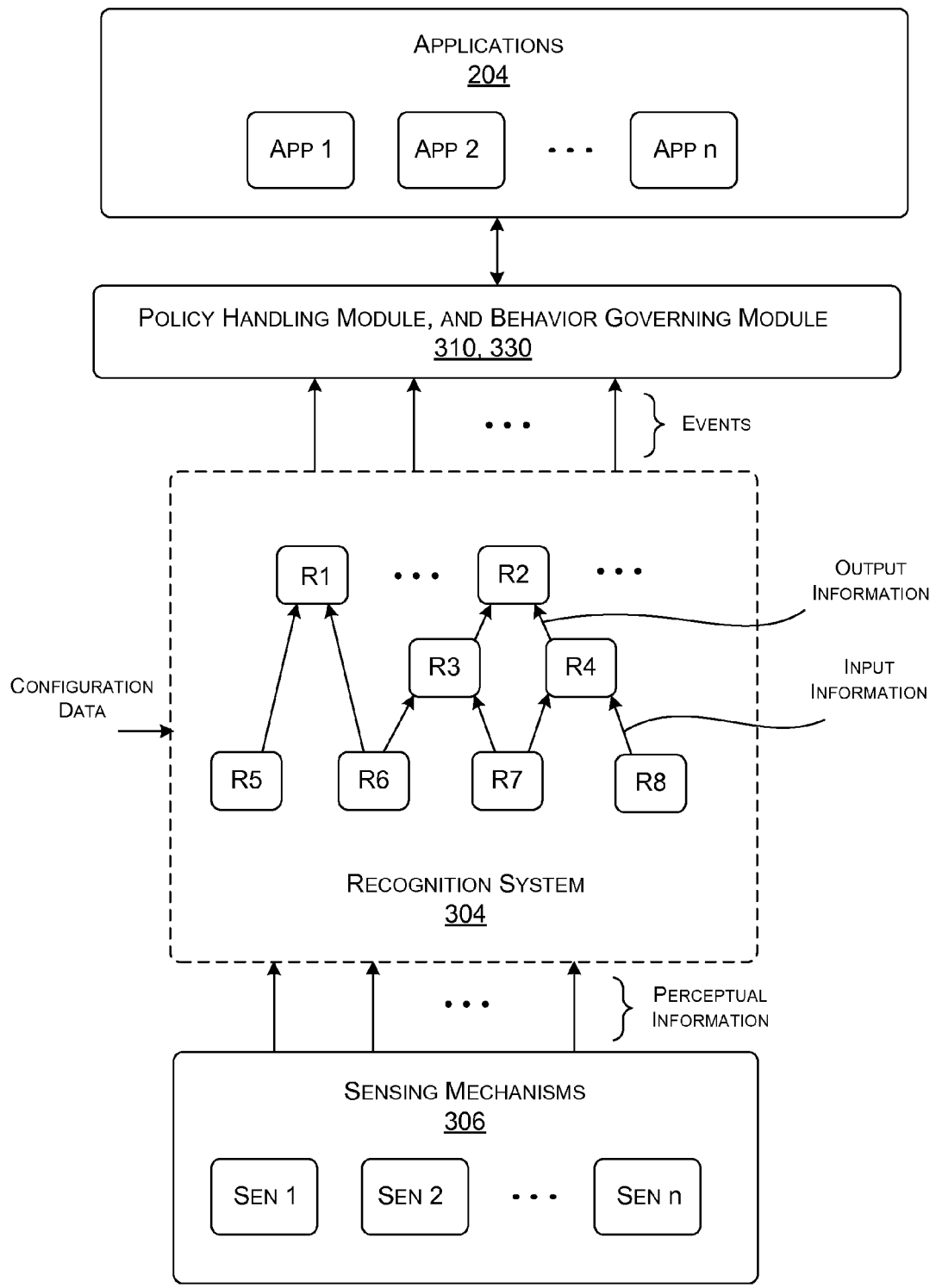
FIG. 7 shows one implementation of a recognition system, which is another component of the management module of FIG. 3.

FIG. 7 shows one illustrative implementation of a recognition system 304. The recognition system 304 operates by receiving perceptual information from one or more sensing mechanisms 306. The recognition system 304 then analyzes the perceptual information using one or more recognizers. Each recognizer receives input information, extracts some low-level or higher-level feature based on the input information, and generates output information which expresses the feature as an event.

The input information that is fed to any recognizer may originate from one or more other recognizers. As a whole, then, the recognition system 304 forms a data flow graph composed of one or more recognizers. The recognition system 304 dynamically constructs the data flow graph based a determination of the information needs of each application that is currently running. That is, the recognition system 304 maps the information needs of the applications 204 to a set of recognizers that satisfy those needs, and then takes into account the input/output dependencies of each recognizer to construct the data flow graph.

Applications 204 receive events generated by the recognition system 304 in the following manner. First, the policy-handling module 310 can receive subscriptions from one or more applications. Each subscription constitutes a request by an application to receive one or more particular types of features from the recognition system 304, once those features are generated. The policy-handling module 310 then proceeds to collect events from the recognizers, where each event expresses one or more detected features. More specifically, the policy-handling module 310 buffers those events in the data store 308. Such events collectively constitute the sensed information.

In parallel with the above collection task, at each instance, the policy handling module 310 determines one or more final policies which apply to the features detected in environment, at the present time. The behavior governing module 330 applies those permissions, e.g., by sending events to authorized applications. The events may be filtered or unfiltered in the manner described above.

In the particular case of an in-band policy, the behavior governing module may correlate events received by different recognizers, such that all the events pertain to the same part of the environment at the same (or substantially the same) time. For example, assume that a QR code is attached to a credit card. A first recognizer can provide raw RGB associated with the credit card, while a second recognizer can provide information extracted from the QR code. The recognition system 304 may optionally tag each event with a frame number and/or a timestamp, associated with the image frame to which it pertains. The behavior generating module 330 can use any of this tagging information to ensure that any policy associated with the QR code pertains to the same image frame from which the QR code was extracted. In other cases, the behavior generating module 330 can assume that the QR events are substantially contemporaneous with associated RGB events, without performing express correlation of events. Analogous synchronization can be performed in the case of audio-related events and other types of events. Finally, as noted above, the behavior governing module 330 can also control other behavior of the applications 204 besides their receipt of events.

Figure 8:
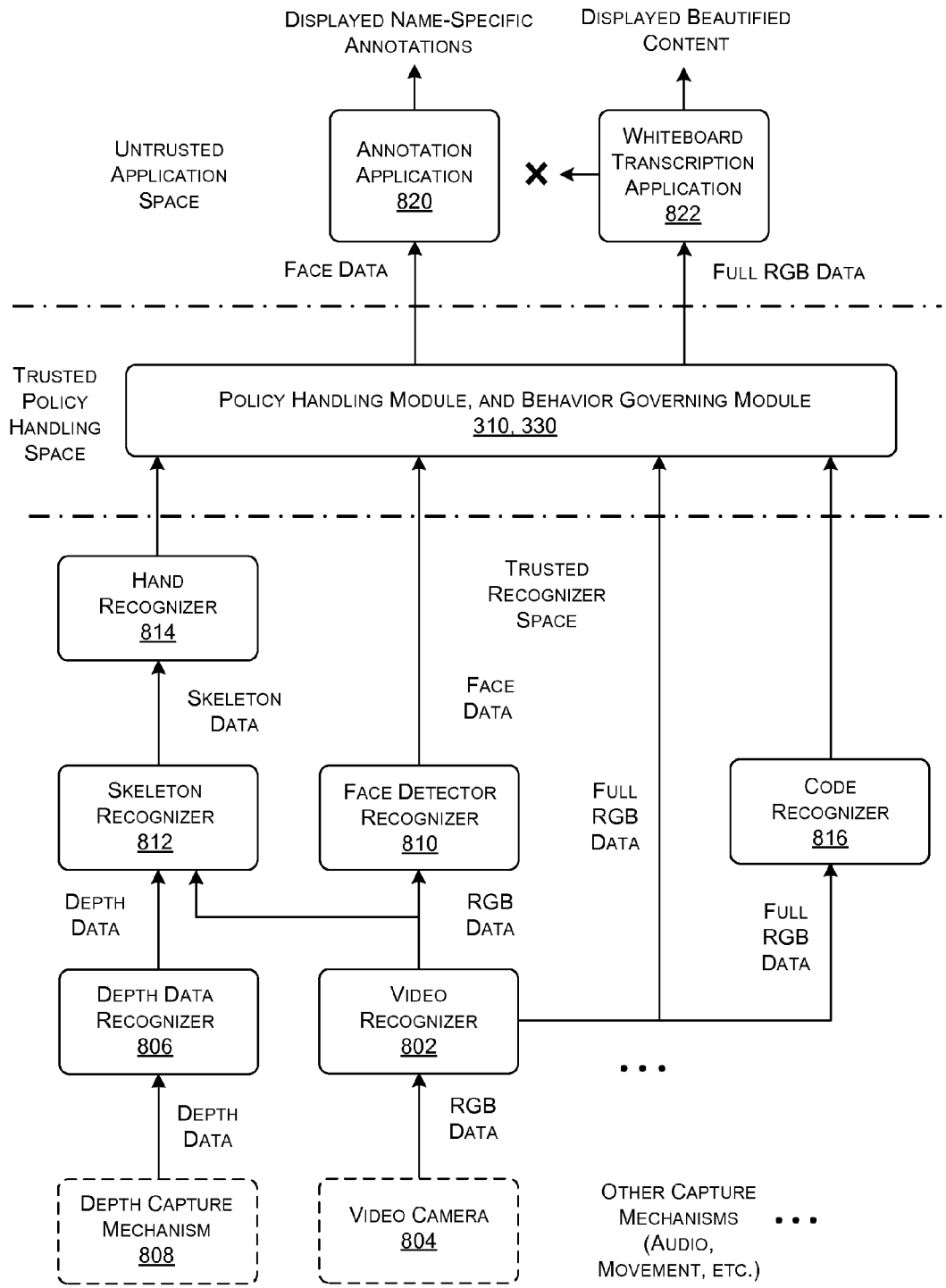
FIG. 8 shows one illustrative instantiation of the recognition system of FIG. 7.

FIG. 8 shows one implementation of the recognition system 304, as it appears at a particular time, for a particular subset of running applications. The recognition system 304 includes a video recognizer 802 which receives raw RGB data from a video camera 804, and outputs an event expressing the same raw video data. In other words, the video recognizer 802 may correspond to a driver which drives the video camera 804. The recognition system 304 also includes a depth recognizer 806 which receives a depth image from a depth capture mechanism 808, and outputs a depth event that expresses the depth image. In other words, the depth recognizer 806 may constitute a driver of the depth capture mechanism 808. The depth capture mechanism 808, in turn, can use any technology to produce a depth image, such as a structured light technique, a time-of-flight technique, a stereoscopic technique, and so forth. One commercial product for providing a depth image is the Kinect™ device produced by Microsoft Corporation of Redmond, Wash. A depth image itself identifies the distances between different points in a scene and a reference point. In one case, the sensing mechanisms (e.g., the video camera 804 and the depth capture mechanism 808) remain "on" in a continuous access state, regardless of whether events, derived from the output of these mechanisms, eventually reach the applications 204. In other words, the point of access throttling is the policy handling module 310 and the behavior generating module 330, not the on/off state of the sensing mechanisms 306.

A face detector recognizer 810 receives the RGB event generated by the video recognizer 802, to generate a face event. That event includes data that describes the face of a person in the scene, if a person is present in the scene, but without revealing the full RGB data associated with the face. A skeleton recognizer 812 receives input events from the depth recognizer 806 and the video recognizer 802. Based on these input events, the skeleton recognizer 812 generates a skeleton event which describes the pose of any person in the scene, if a person is present. A hand recognizer 814 receives the skeleton event and provides an output event that describes the positions and orientations of the person's hands.

A code recognizer 816 identifies the presence of a code-bearing label, such as a QR code. The code recognizer 816 can also provide information extracted from the code-bearing label. The code recognizer 816 can optionally also interpret the information extracted from the code-bearing label, such as by converting the code to a numerical string, etc.

In the manner described above, the policy handling module 310 receives all of these events and buffers them in the data store 308. The behavior governing module 330 then uses the resultant permission information to forward events to appropriate applications, some of which may be filtered and some of which may be unfiltered. For example, the annotation application 818 receives face events from the face detector recognizer 810, if permitted by the permission information. The transcription application 820 receives the raw RGB events from the video recognizer 802, if permitted by the permission information. No application currently relies on events generated by any of the hand recognizer 814, skeleton recognizer 812, or depth recognizer 806. In view of that, the recognition system 304 may choose to prune those recognizers from the data flow graph. If later needed by some new application, the recognition system 304 can recreate those nodes.

Figure 9:
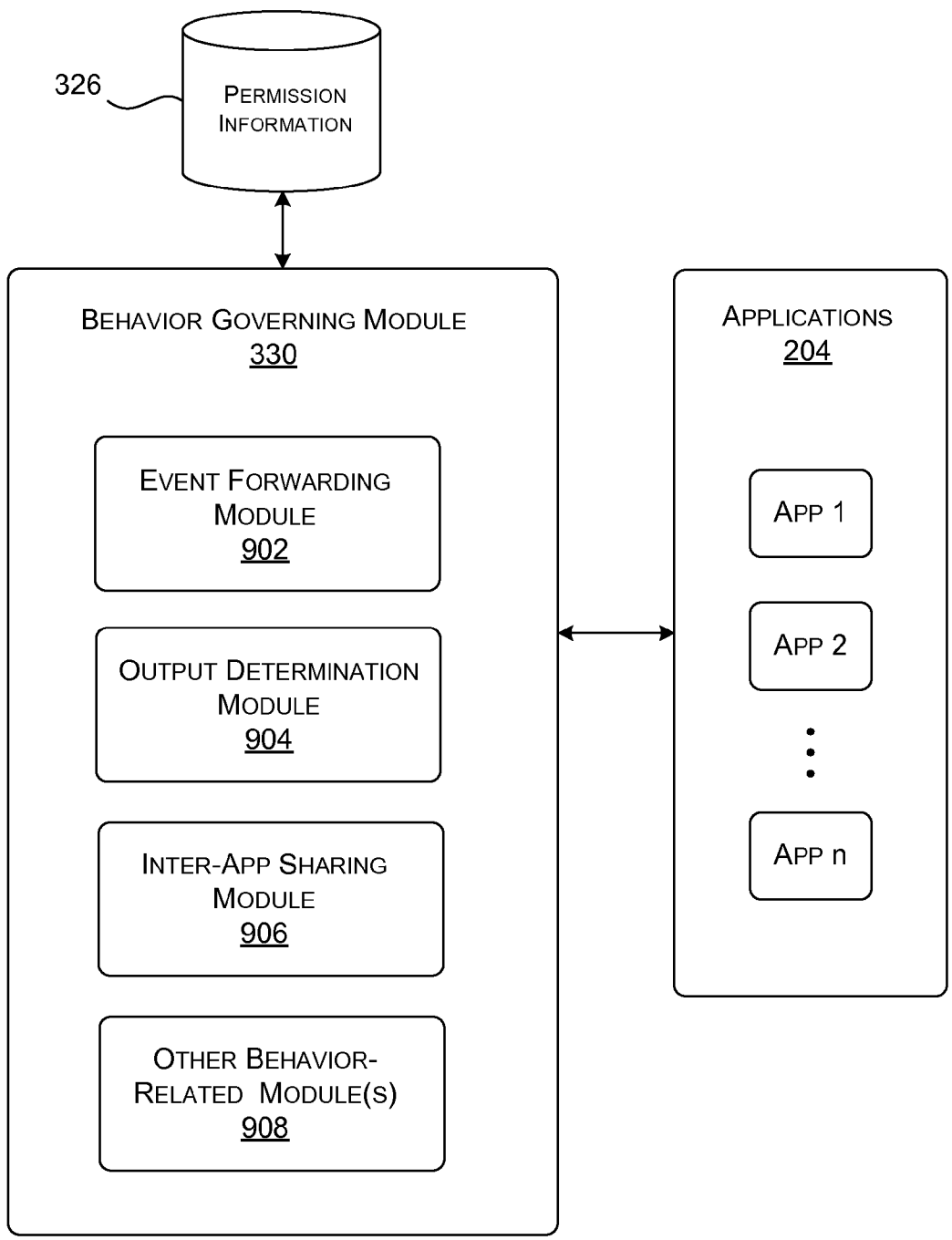
FIG. 9 shows one illustrative implementation of a behavior governing module, which is another component of the management module of FIG. 3.

FIG. 9 shows one implementation of the behavior governing module 330, which governs the behavior of one or more applications 204 based on the permission information provided in the data store 326. The behavior governing module 330 includes an event forwarding module 902 which controls the forwarding of events from the recognition system 304 to the subscribing applications in the manner described above, based on the permission information. An output determination module 904 controls what types of information each application is permitted to send to each output device. An inter-app sharing module 906 controls what information each application is allowed to share with other applications and/or other entities. The other behavior-related module(s) 908 indicates that the behavior governing module 330 can control any other aspect of the applications' behaviors, such as by controlling what code an application is permitted to run. In the manner set forth above with respect to the event forwarding module, any behavioral constraint can take the form of a binary yes/no decision, or a choice among plural processing options. At least one processing option may entail further modifying an event before it is send to an application, or choosing among plural versions of a basic event.

FIG. 10 shows one computer-implemented system 1002 that can implement the reality-sensing framework 202 of FIG. 2. The system 1002 includes at least one local computing device 1004, such as any of a personal computer, a laptop computer, a set-top box, a game console, a pose determination device (e.g., the Kinect™ device), a smartphone, a tablet computing device, and so on. In one case, the local computing device 1004 implements all aspects of the reality-sensing framework 202 of FIG. 2 including the management module 212 and the shared renderer 220.

In another implementation, the local computing device 1004 can implement some aspects of the reality-sensing framework 202, while a remote computing framework 1006 may implement other aspects of the reality-sensing framework 202. In one implementation, the remote computing framework 1006 may be implemented as one or more remote servers. The local computing device 1004 may interact with the remote computing framework 1006 via any communication conduit 1008, such as a local area network, a wide area network (e.g., the Internet), or a point-to-point link, and so forth. The functionality that is provided at the local computing device 1004 is referred to as local resources 1010.

In one illustrative allocation of functions, the local computing device 1004 can implement one or more local recognizers, while the remote computing framework 1006 can implement one or more remote recognizers. Hence, the recognition system 304 in this system 1002 is distributed over at least two different locations. More specifically, the remote computing framework 1006 can handle the most computationally intensive recognizers in the recognition system 304, such as those recognizers that perform complex image processing tasks (such as, in one case, a face recognition task). In another case, computationally intensive aspects of the mapping module 312 can be delegated to the remote computing framework 1006.

In one implementation, the delegation of processing tasks between the local computing device 1004 and the remote computing framework 1006 is static, or at least slowly varying. In another case, a routing module 1012 can dynamically delegate tasks between the local computing device 1004 and the remote computing framework 1006 based on at least one computational workload factor and/or other consideration(s). For example, the routing module 1012 can automatically delegate a recognition task to the remote computing framework 1006 when the amount of uncompleted work in a workload queue exceeds a prescribed threshold. In addition, or alternatively, the routing module 1012 can automatically migrate a recognition task from the local computing device 1004 to the remote computing framework 1006 if the task is taking more than a prescribed amount of time to complete on the local computing device 1004, and/or based on other considerations. The routing module 1012 may be implemented by the management module 212 and/or other component of the reality-sensing framework 202.

A remote component (such as a remote recognizer) of the remote computing framework 1006 may provide service to any number of local computing devices at the same time. For example, the remote component may provide service to both the local computing device 1004 and a local computing device 1014. In this way, the remote component simulates the operation of a virtual machine (by providing service to two or more independent tasks on the same physical platform), but without providing actual virtual machine functionality.

B. Illustrative Processes

Figure 11:
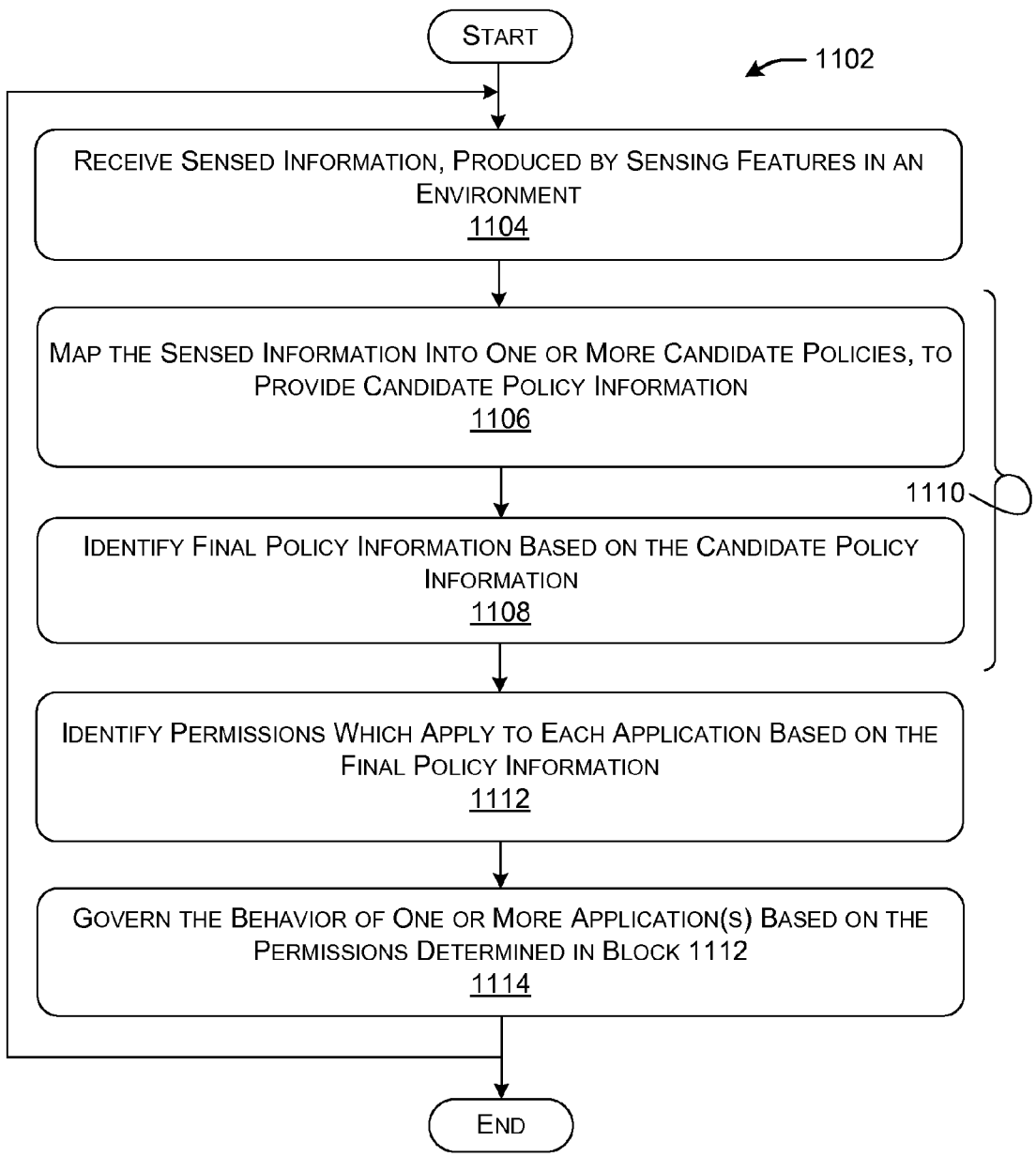
FIG. 11 is a flowchart that shows one manner of operation of the management module of FIG. 3.

FIG. 11 shows a procedure 1102 that explains one manner of operation of the management of FIG. 3. Since the principles underlying the operation of the management module 212 have already been described in Section A, certain operations will be addressed in summary fashion in this section.

In block 1104, the policy handling module 310 receives sensed information from the recognition system 304, expressing sensed features in the environment. In block 1106, the mapping module 312 maps the sensed features into one or more candidate policies. Each candidate policy may pertain to one or more objects in the sensed environment. In block 1108, the policy resolution module 318 determines a final policy for each object, to provide final policy information. Operation 1110 encompasses blocks 1106 and 1108; it broadly corresponds to the task of mapping features to final policy information. In block 1112, the permission setting module 324 identifies permission information based on the final policy information. In block 1114, the behavior governing module 220 governs the behavior of the applications based on the permission information.

C. Representative Computing Functionality

FIG. 12 shows computing functionality 1202 that can be used to implement any aspect of the reality-sensing framework 202 of FIG. 2. For instance, the type of computing functionality 1202 shown in FIG. 12 can be used to implement the local computing device 1004 of FIG. 10 and/or a computer server associated with the remote computing framework 1006. In all cases, the computing functionality 1202 represents one or more physical and tangible processing mechanisms.

The computing functionality 1202 can include one or more processing devices 1204, such as one or more central processing units (CPUs), and/or one or more graphical processing units (GPUs), and so on.

The computing functionality 1202 can also include any storage resources 1206 for storing any kind of information, such as code, settings, data, etc. Without limitation, for instance, the storage resources 1206 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removal component of the computing functionality 1202. The computing functionality 1202 may perform any of the functions described above when the processing devices 1204 carry out instructions stored in any storage resource or combination of storage resources.

As to terminology, any of the storage resources 1206, or any combination of the storage resources 1206, may be regarded as a computer readable medium. In many cases, a computer readable medium represents some form of physical and tangible entity. The term computer readable medium also encompasses propagated signals, e.g., transmitted or received via physical conduit and/or air or other wireless medium, etc. However, the specific terms "computer readable storage medium" and "computer readable medium device" expressly exclude propagated signals per se, while including all other forms of computer readable media.

The computing functionality 1202 also includes one or more drive mechanisms 1208 for interacting with any storage resource, such as a hard disk drive mechanism, an optical disk drive mechanism, and so on.

The computing functionality 1202 also includes an input/output module 1210 for receiving various inputs (via input devices 1212), and for providing various outputs (via output devices 1214). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1216 and an associated graphical user interface (GUI) 1218. Other output devices include a printer, a model-generating mechanism, a tactile output mechanism, an archival mechanism (for storing output information), and so on. The computing functionality 1202 can also include one or more network interfaces 1220 for exchanging data with other devices via one or more communication conduits 1222. One or more communication buses 1224 communicatively couple the above-described components together.

The communication conduit(s) 1222 can be implemented in any manner, e.g., by a local area network, a wide area network (e.g., the Internet), point-to-point connections, etc., or any combination thereof. The communication conduit(s) 1222 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1202 can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc.

In closing, the description may have described various concepts in the context of illustrative challenges or problems. This manner of explanation does not constitute a representation that others have appreciated and/or articulated the challenges or problems in the manner specified herein. Further, the claimed subject matter is not limited to implementations that solve any or all of the noted challenges/problems.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims

What is claimed is:

1. A method, implemented by one or more computing devices, the method comprising:
    receiving sensed information that represents a plurality of features in an environment;
    associating the sensed information with one or more final policies to provide final policy information, the final policy information pertaining to at least one object in the environment and being specified, at least in part, by the environment;
    identifying permissions which apply to one or more applications, based at least on the final policy information, to collectively provide permission information; and
    governing behavior of said one or more applications based at least on the permission information,
    wherein said governing comprises:
        providing a filtered event, the filtered event expressing information obtained from the environment which has been filtered to reduce a presence of private information; and
        sending the filtered event to an individual application, and
    wherein the filtered event is produced by redacting parts of the information obtained from the environment.

2. The method of claim 1, wherein said associating includes:
    identifying a presence of a physical entity within the environment; and
    determining an individual final policy based at least on the physical entity.

3. The method of claim 1, wherein said associating includes:
    identifying a sensed event occurring within the environment; and
    determining an individual final policy based at least on the sensed event.

4. The method of claim 1, wherein said associating includes:
    identifying an explicit policy-specifying feature within the environment; and
    identifying an individual final policy based at least on the explicit policy-specifying feature.

5. The method of claim 1, wherein said associating includes determining, for at least one final policy, whether said at least one final policy is valid.

6. The method of claim 1, wherein the associating includes:
    determining a set of one or more candidate policies associated with a particular object in the environment; and
    choosing an individual final policy from among the set of one or more candidate policies.

7. The method of claim 6, wherein said choosing comprises choosing, as the individual final policy, an individual candidate policy that is most restrictive within the set.

8. The method of claim 6, wherein said choosing comprises using a user-specified policy to override at least one other policy in the set.

9. The method of claim 8, wherein said choosing is based, at least in part, on a determination of whether said at least one other policy is designated as mandatory.

10. The method of claim 6, wherein said choosing comprises inviting a user to choose among two or more candidate policies.

11. The method of claim 1, wherein at least one final policy governs a behavior of at least one application until an explicit mode-changing event occurs.

12. The method of claim 1, wherein at least one final policy governs a behavior of at least one application for as long as a cue associated with said at least one final policy is detected within the environment.

13. The method of claim 1, wherein said governing comprises precluding or permitting another individual application from receiving another event expressing information obtained from the environment.

14. The method of claim 1, wherein the filtered event expresses video information and said redacting comprises removing a recognized object from the video information.

15. The method of claim 14, wherein the recognized object is a face of a person that appears in the video information.

16. The method of claim 1, wherein said governing comprises determining data items that the individual application is permitted to share with other entities, based at least on the permission information.

17. The method of claim 1, wherein said governing comprises determining output information that another individual application is permitted to send to one or more output devices, based at least on the permission information.

18. A computer-implemented system comprising:
    one or more processing devices; and
    one or more computer readable storage media storing instructions which, when executed by the one or more processing devices, cause the one or more processing devices to:
    map sensed information, obtained by sensing an environment, into one or more candidate policies to provide candidate policy information, the candidate policy information applying to recognized objects in the environment, wherein the recognized objects include a first recognized object and a second recognized object that appear concurrently in the sensed environment;
    determine a first final policy for the first recognized object and a second final policy for the second recognized object based at least on the candidate policy information;
    identify first permissions which apply to a first application with respect to the first recognized object based at least on the first final policy;
    identify second permissions which apply to a second application with respect to the second recognized object based at least on the second final policy; and
    filter the first recognized object to remove first private information based at least on the first permissions and filter the second recognized object to remove second private information based at least on the second permissions.

19. The computer-implemented system of claim 18, wherein the first private information comprises text and the second private information comprises image information.

20. A computing system comprising:
   a plurality of applications;
   one or more environment sensing mechanisms configured to sense an environment and to obtain raw perceptual features that characterize the sensed environment;
   one or more processing devices; and
   one or more computer readable storage media storing instructions which, when executed by the one or more processing devices, cause the one or more processing devices to:
      receive subscription requests from individual applications to receive events characterizing the sensed environment;
      process the raw perceptual features to identify different recognized objects present in the sensed environment and to obtain the events characterizing the sensed environment;
      identify different policies associated with the different recognized objects, the different policies having different permissions for different applications;
      filter the events consistently with the different permissions to remove private information while the one or more environment sensing mechanisms continue to sense the environment; and
      forward the filtered events to the different applications.

* * * * *